United States Patent [19]

Yamamoto et al.

[11] Patent Number: 4,967,341

[45] Date of Patent: Oct. 30, 1990

[54] METHOD AND APPARATUS FOR PROCESSING DATA BASE

[75] Inventors: Akira Yamamoto; Tadashi Ohsone, both of Yokohama; Masashi Tsuchida, Tokyo; Hiroyuki Kitajima, Yokohama; Kazuhiro Satoh, Ebina; Yoshiaki Yamashita; Nobuhiro Taniguchi, both of Hadano; Kazuhiko Ohmachi, Kawasaki; Shinichi Fukushima, Kamakura, all of Japan

[73] Assignee: Hitachi, Ltd., Tokyo, Japan

[21] Appl. No.: 418,343

[22] Filed: Oct. 6, 1989

Related U.S. Application Data

[63] Continuation of Ser. No. 13,440, Feb. 11, 1987, abandoned.

[30] Foreign Application Priority Data

Feb. 14, 1986 [JP] Japan ............... 61-28807
Mar. 12, 1986 [JP] Japan ............... 61-52438

[51] Int. Cl.$^5$ .................... G06F 15/20; G06F 15/40
[52] U.S. Cl. .................... 364/200; 364/243; 364/252.4; 364/255.7; 364/282.1; 364/283.4
[58] Field of Search ................ 364/200, 300, 900

[56] References Cited

U.S. PATENT DOCUMENTS

| 4,078,260 | 3/1978 | Chen et al. | 364/900 |
| 4,079,234 | 3/1978 | Kashio | 364/900 |
| 4,128,891 | 12/1978 | Lin et al. | 364/900 |
| 4,130,867 | 12/1978 | Bachman et al. | 364/200 |
| 4,433,392 | 2/1984 | Beaven | 364/900 |
| 4,497,039 | 1/1985 | Kitakami et al. | 364/300 |
| 4,506,326 | 3/1985 | Shaw et al. | 364/900 |
| 4,514,826 | 4/1985 | Iwata et al. | 364/900 |
| 4,543,630 | 9/1985 | Neches | 364/200 |
| 4,555,771 | 11/1985 | Hayashi | 364/900 |
| 4,598,385 | 7/1986 | Kessels et al. | 364/900 |
| 4,631,664 | 12/1986 | Bachman | 364/300 |
| 4,644,471 | 2/1987 | Kojima et al. | 364/300 |
| 4,707,781 | 11/1987 | Sullivan et al. | 364/200 |
| 4,785,400 | 11/1988 | Kojima et al. | 364/300 |
| 4,811,207 | 3/1989 | Hikita et al. | 364/200 |

Primary Examiner—Parshotam S. Lall
Assistant Examiner—Christopher L. Makay
Attorney, Agent, or Firm—Antonelli, Terry, Stout & Kraus

[57] ABSTRACT

A set of sorted columns of one table stored in a DB machine are binary-searched by a hardware in synchronism with data transfer when another table is read from a disk unit, to select a row to be joined. Where a key word sequence to be searched is stored in ascending or descending order, determination of a maximum address in an area in which key words smaller than a search key are stored and determination of a maximum address in an area in which the key words smaller than or equal to the search key are stored are parallelly executed to determine the store range in one searching.

15 Claims, 21 Drawing Sheets

| ADDRESS | |
|---|---|
| 1 | 2 —3060 |
| 2 | 6 |
| 3 | 10 |
| 4 | 10 |
| 5 | 11 |
| 6 | 15 |
| 7 | 19 |

METHOD AND APPARATUS FOR PROCESSING DATA BASE

This application is a continuation of application Ser. No. 013,440, filed on Feb. 11, 1987, now abandoned.

BACKGROUND OF THE INVENTION

The present invention relates to a method and an apparatus for supporting high speed joining or searching in a relational data base (RDB) machine which executes an RDB operation in synchronism with the data transfer in a file system such as an RDB system.

In the data base (DB) machine which is synchronous with the data transfer, it is easy to carry out an operation relating to a single table, but in the join operation, data in one table must be stored into the DB machine, and if the join operation is performed in the DB machine, data to be transferred to a CPU increase. However, the join operation includes a large amount of processing and a need for rapid processing is high.

This is described in "Content Addressable File Store" by R. W. Michell, Proceedings of Online Conference on Database Technology, April 1976.

The CAFS (content addressable file store) supports high speed joining by utilizing a Hashed bit array or Hashing. However, when the Hash is used, a problem of synonym arises. It is therefore necessary to select the Hashing function which generates few synonyms. This is practically difficult because a selection of the function is dependent on a distribution of data.

In data base processing or file processing, searching is a basic operation. Since the searching is done very frequently and a processing load thereof is relatively high, it is important to improve the speed of the searching. If the searching is done by software, the efficiency of processing such as data comparison and data structure operation is lower than that attained by specialized hardware, and the efficiency is low in a general purpose computer.

As the LSI technology advances, an LSI chip can be manufactured with a relatively low cost and it has been proposed to develop specialized hardware for searching only so that the searching is speeded up by the hardware. See "Pipeline Searching and Sorting Modules as Components of a Dataflow Computer", Tanaka Y. et. al., IFIP Congress 80' pages 427–432, October 1980; and "Content Addressable Parallel Processors", Foster C. C., Van Nostrand Reinhold, 1976.

This is also described in the Japanese Patent Application No. 59-173310.

SUMMARY OF THE INVENTION

In accordance with the present invention, in an I/0 system DB machine attached to an I/0 system, most portions of a join operation are performed in synchronism with the data transfer to speed up the join operation in the RDB system.

It is a first object of the present invention to provide a new DB machine which performs join operation of tables in parallel with the data transfer between I/O units or memory units such as a file and an information processing unit.

It is a second object of the present invention to provide a system which detects a range of storage fields of a key word in one searching even if there is duplication of the key word in a key word sequence.

In order to achieve the above objects, the present invention provides an information processing system comprising at least one CPU, a first storage unit, a second storage unit, and at least one data base processing unit, wherein contents of at least one column of a first table in the first storage unit to be specified with a data base operation between first storage unit and content of a column of a second table to be joined with the first table are stored in the data base processing unit in synchronism with the transfer of the table of the first storage unit to the second storage unit.

The present invention can be implemented by preparing a key word sequence to be searched, inputting a search key sequentially, outputting an address of an area in which a key word which matches with the input search key exists, and if the key word in the key word sequence are ordered ascendingly, detecting a largest address in an area in which key words which are smaller than the search key are stored, and detecting the largest address in an area in which key words which are smaller than or equal to the search key are stored.

BRIEF DESCRIPTION OF THE DRAWINGS

FIG. 4 shows searching by a single table in the present invention.

DESCRIPTION OF THE PREFERRED EMBODIMENTS

Figure 1:
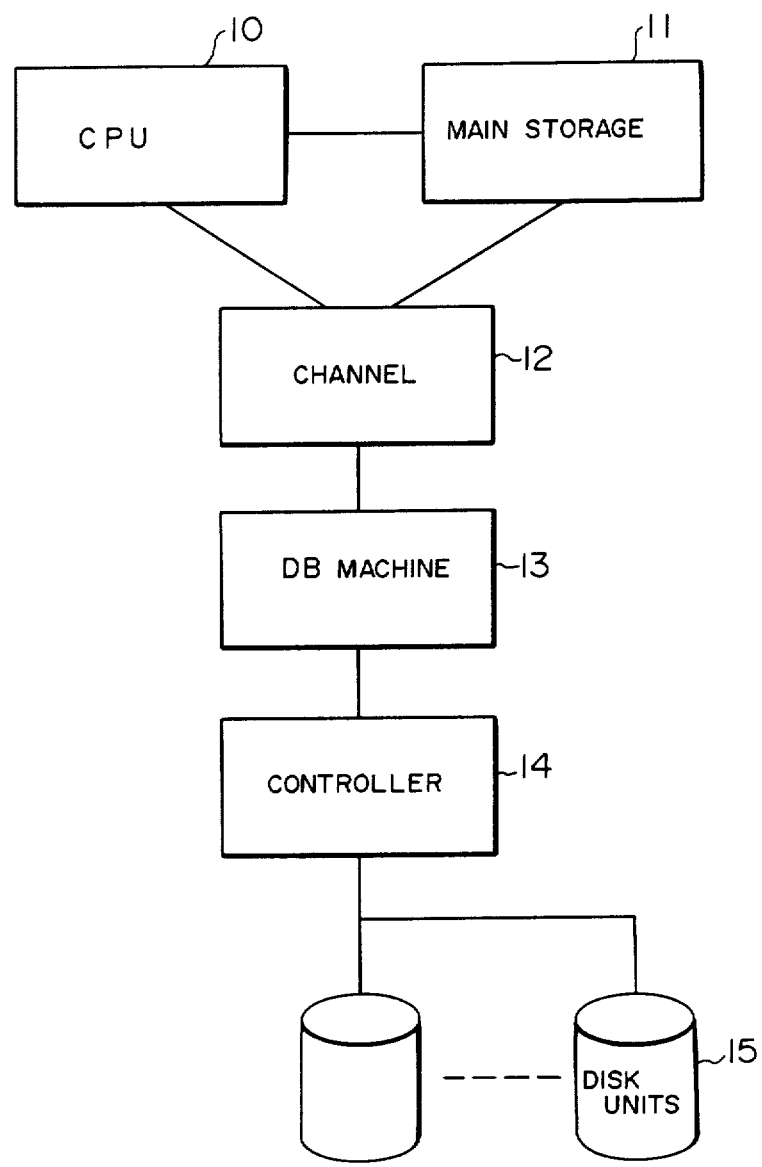
FIG. 1 shows a block diagram of a computer system having a DB machine in accordance with a first embodiment of the present invention.

Data in the RDB file are constructed by a matrix called a table. A record in a conventional file is called a row, and a field is called a column.

DB processing in the RDB relates to either a single table or a plurality of tables. The processing for the plurality of tables accompanies with a join operation which joins rows of the tables.

The join operation usually joins tables through a common column in the tables. (This column is called a join column.)

Specifically, the following procedure is carried out. A column a of a table 1 and a column b of a table 2 are used as the join column. When the column a of a row of the table 1 has a value A, this row and rows of the table 2 whose columns b have the value A are joined. Accordingly, if there are n rows in the table 2 whose columns b have the value A, new n rows are joined. (In a rare case there is a request to join rows of the table 2 whose columns b is no larger than the value A.) The above step is carried out for all rows of the Table 1, and the joining of the tables is If a value of a join column of a row of the table 1 is not included in a set of the values of the join columns of the table 2, this row has no corresponding row to be joined in the table 2 and it need not be joined. Accordingly when the data of the table 1 is fetched from a disk unit, a set of the join columns of the table 2 is stored in the DB machine to determine whether it contains the values of the join column of the table 1.

This processing method has been used in the ICL CAFS. As described above, since it uses the Hashing function, the synonym is generated and a sufficient advantage is not achieved.

In the present invention, the values of the join column are compared. If they are simply processed, N times of processing are required in one row transfer time, where N is the number of join column of the table 2. It is, therefore, difficult to carry out those processings in connection with the data transfer. However, if the values of the join column are previously sorted, a binary search may be used and the number of times of processing may be $\log_2 N$. Thus, even if N=1000, the number of times of processing is approximately 10.

Accordingly, a specialized hardware for binary search is provided to carry out the above processing.

A set of a sorted values of column of one table stored in the DB machine are used to select rows to be joined by means of the binary search hardware, in synchronism with the data transfer when another table is read from the disk unit.

For the operation request to the DB, it is usual that not only a conditional operation between a column of a table and a column of another table but also a conditional operation between other columns in the same table are specified. Further, a request to extract an appointed or specified column from the rows which meet the condition is specified. Accordingly, the DB machine should have a function to parallelly execute the binary search and the above processing.

A first embodiment of the present invention is now explained with reference to drawings. The DB machine, which is loaded anywhere in the data transfer path, for example between a channel unit and a controller unit, is able to process almost all join operations in parallel with the data transfer. So, the DB machine improves the speed of the join operation. The DB machine function for executing the above processing may be incorporated in the channel unit or controller.

FIG. 1 shows a hardware configuration of a computer system having the above DB machine. The computer system comprises a CPU 10, a main storage 11, a channel 12, a DB machine 13, a controller 14 and one or more disk units 15.

In the present embodiment, the disk unit is used as a secondary storage, although other devices may be used. In the present embodiment, the DB machine 13 is arranged between the channel 12 and the controller 14, although it may be arranged at any position between the disk unit 15 and the main storage 11 or the function of the DB machine 13 may be incorporated in any device. In the present embodiment, the channel 12 and succeeding units are in one set channel, although the channel 12, DB machine 13 and controller 14 may be arranged in a plurality of sets in the computer system.

Figure 2:
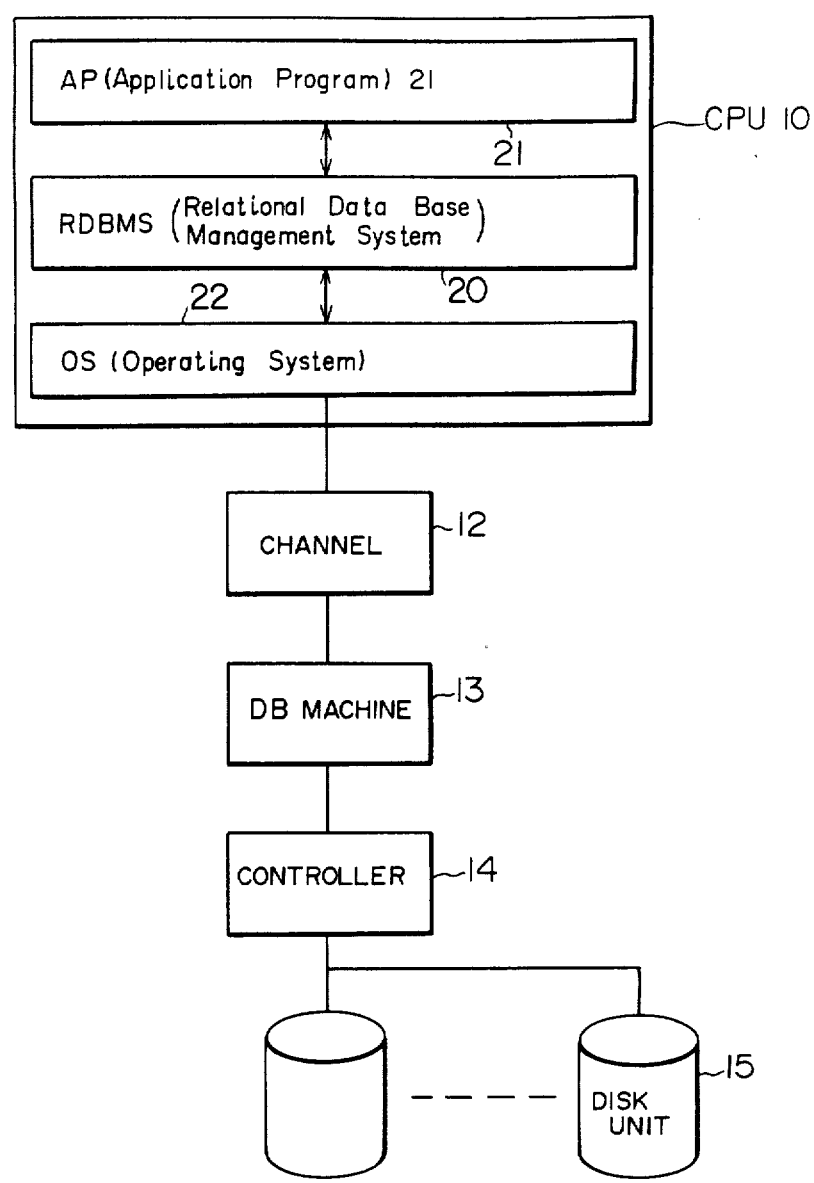
FIG. 2 shows a block diagram of a relationship between the DB machine of the present invention and a software on the CPU.

FIG. 2 shows a configuration of a software of the computer system. The software resides in the main storage 11 and is executed in the CPU 10. The software comprises a relational database management system (RDBMS) 20, an application program (AP) 21 issuing a DB operation request for the RDBMS 20 and an operating system (OS) 22 to manage a hardware and the computer system. If the RDBMS 20 has a management function for the hardware, the OS 22 may not be provided. The AP 21 may be present in another unit. In this case, however, a communication control program for communicating with the AP 21 in the other unit must reside in the CPU 10 and the main storage 11. In the present embodiment, the RDBMS 20, AP 21 and OS 22 reside in the CPU 10 and the main storage 11 as described above. The AP 21 issues a DB operation request to the RDBMS 20. The RDBMS 20 divides the DB operation request received from the AP 21 into several partial DB operation requests in accordance with the content thereof, and sends the partial DB operation requests to the DB machine 13 through the OS 22 or sends the undivided DB operation request 13 to the DB machine 13 through the OS 22.

Figure 3:
FIG. 3 shows a configuration of a table.

The data handled by the RDBMS 20 are a set of matrix tables 30 (conventional files) as shown in FIG. 3. The table 30 comprises rows 31 and columns 32. The rows 31 correspond to records of the conventional file, and the columns 32 correspond to fields of the conventional file. The RDB operation builds a new table from the set of tables and delivers it to the AP 21 which has issued the DB operation request.

The DB operation request includes a request to build a partial table 30 from a table 30 (in this case, the entire table may be selected) or a request to build a new table 30 based on a plurality of tables 30. In this case, the new table 30 may be prepared from the respective entire tables 30, or partial tables 30 may be prepared from an individual table 30 and the new table may be prepared based on the plurality of partial tables 30. Alternatively, the new table 30 may be prepared from one entire table 30 and a partial table 30 prepared from other tables 30.

Figure 6:
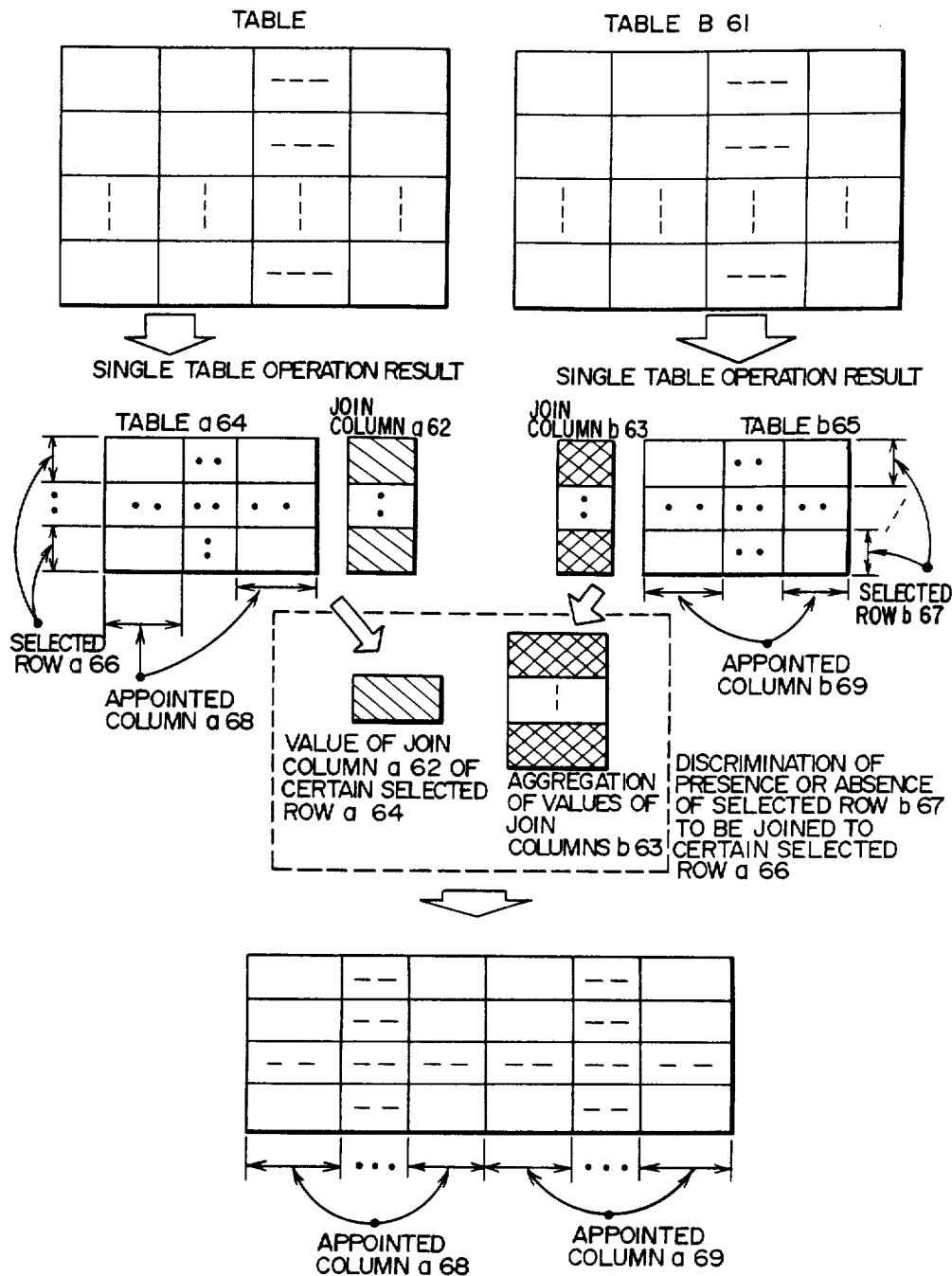
FIG. 6 shows joining of tables in the present invention.

FIG. 4 shows a DB operation request for a single table. A condition is set for the row 31. (Condition such as an appointed or specified column 32 in the row 31 is equal to certain value or values of two appointed or specified columns are equal is set. This is illustrated in FIG. 6. A condition for the column 32 and the constant is called a selection, and a condition for the columns 32 is called a restriction.) If the condition is met, the result is true, and if it is not met, the result is false. In general, a plurality of conditions may be set and the relationship among the conditions is expressed by Boolean expression (AND, OR). The rows having the true results for the Boolean expression are selected and they are called selected rows 41. Appointed columns 32 are extracted from those rows 31. They are called appointed columns or specified columns 42. As a result, the table 30 which comprises the selected row 41 and the specified column is derived. This result is called a single table operation result table 40.

Figure 5:
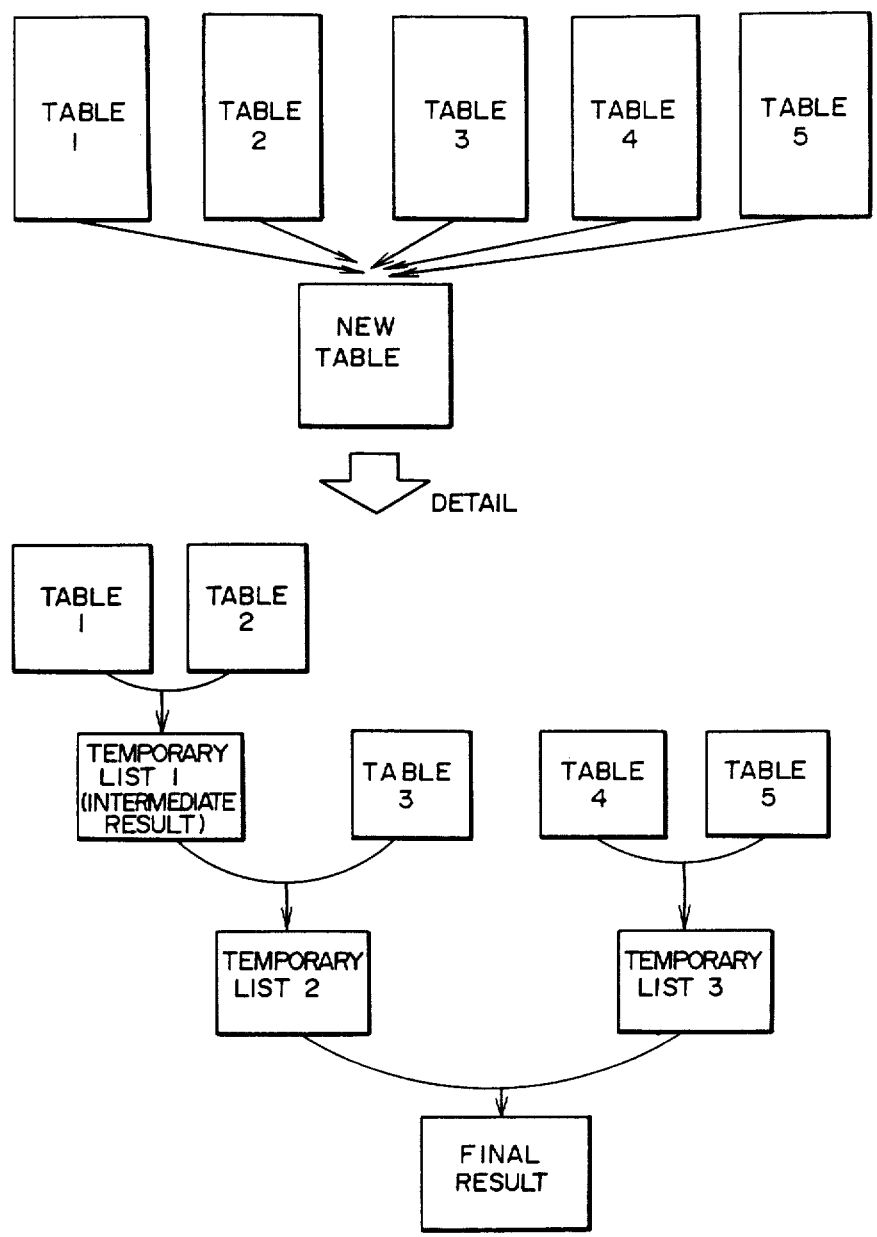
FIG. 5 shows searching by a plurality of tables in the present invention.

FIG. 5 shows a DB operation in which a new table 30 is prepared from a plurality of tables 30. This can be decomposed in to joining of two tables 30. A processing efficiency is high dependent on the order of processing. This decision is made by the RDBMS 20 and the DB machine 13 receives the decomposed operation request. The function which the DB machine 13 should have is explained in connection with the joining of two tables.

FIG. 6 shows a detail of joining of two tables 30. Usually, a table A 60 and a table B 61 have selection and restriction conditions set in the tables, and conditions for the columns 31 between the tables 30 are set. This is called a join column. In FIG. 6, a join column a 62 is for the table A 60 and a join column b 63 is for the table B 61. For example, if a condition that a value of the join column a of certain row 31 of the table A 60 is $\alpha$, and the conditions for the join column a 62 and the join column b are equal is set, it means that a request to join a set of rows whose values of the join column b of the table B are $\alpha$ is specified. Accordingly, which rows 31 of different tables are to be joined is determined only by the operation result of the join columns. In this case, since the tables A 60 and B 61 are on the disk unit 15, either one of the table is read first. Let us assume that the table B 61 is read. Accordingly, when the data of the table A 60 is read, if there are rows which meet a selection/ restriction condition of the table B 61, that is, the set of values of the join column a 62 of the selected row b 67 have been stored in the machine, the set of values of the join column b 63 of the selected row b 67 of the table B 61 and the set of values of the join column a 62 of the selected row a 66 of the table A 60 may be processed. For example, even if a row meets the selection/restriction condition in the table A 60, it need not be selected if the value of the join column a 62 of the row is not contained in the set of values of the join column b 63 of the table B 61. In order to carry out the operation at a high speed, it is necessary to previously sort the set of values of the column a 62 of the table A 60. Thereafter, the selected row a 64 and the selected row b 67 are joined to prepare a join operation table 610.

In summary, in order to efficiently join the table 30, the DB machine should have the following functions.

Figure 12:
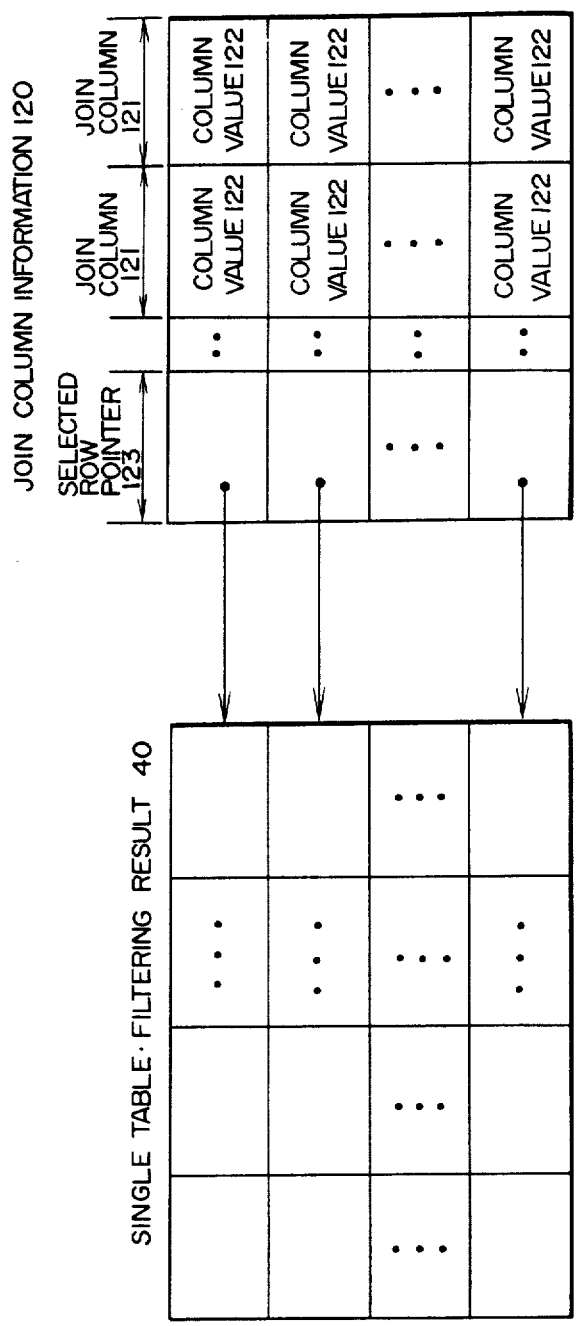
FIG. 12 shows a format of join column information of the present invention.

(1) The DB machine 13 has a function to extract a column (join column) to be joined with other table 30, independently from an appointed or specified column specified to be delivered from the AP 21, during the data transfer of the table 30. The join column should be able to specify or appoint a plurality of join columns to allow joining of n tables. This is called join column information 120 as shown in FIG. 12. The join column information 120 includes a column value 122 of one or more join columns, and a selected row pointer 123 which allow easy location of an address on the main storage 11 in which the selected row 41 derived by extracting the column value 122 is stored or on the buffer of the DB machine 12. This is done for increasing the speed of joining of the selected row 41.

(2) The DB machine 12 has a function for performing operation for the set of values of the sorted join columns of other table 30 in parallel with the operation for the condition of selection/restriction specified in the table 30, during the transfer of the table 30.

(3) The following functions are preferably provided in connection with the join column information.
   (a) A function to store the join column information 120 on a plurality of table 30 in the DB machine.
   (b) A function to sort each join column 121 and set to individual join column information 120.
   (c) A function to receive the join column information 120 from the RDBMS 20 on the CPU 10 and store it in the DB machine 13.

At least one join column information 120 must be able to be stored in the DB machine 13. In order to allow joining of three or more tables, it is preferable that a plurality of join column information may be stored in the DB machine 13. The function (c) receives the join column information 120 from the RDBMS 20. It is also necessary when there are a plurality of DB machines in the computer system or the buffer in the DB machine 13 is insufficient the information once sent to the main storage 11 must be reloaded.

The AP 21 may issue a request to sort the selected rows 41 in accordance with a value of certain specified column 42. In this case, the above information may be prepared for the columns to be sorted.

Figure 7:
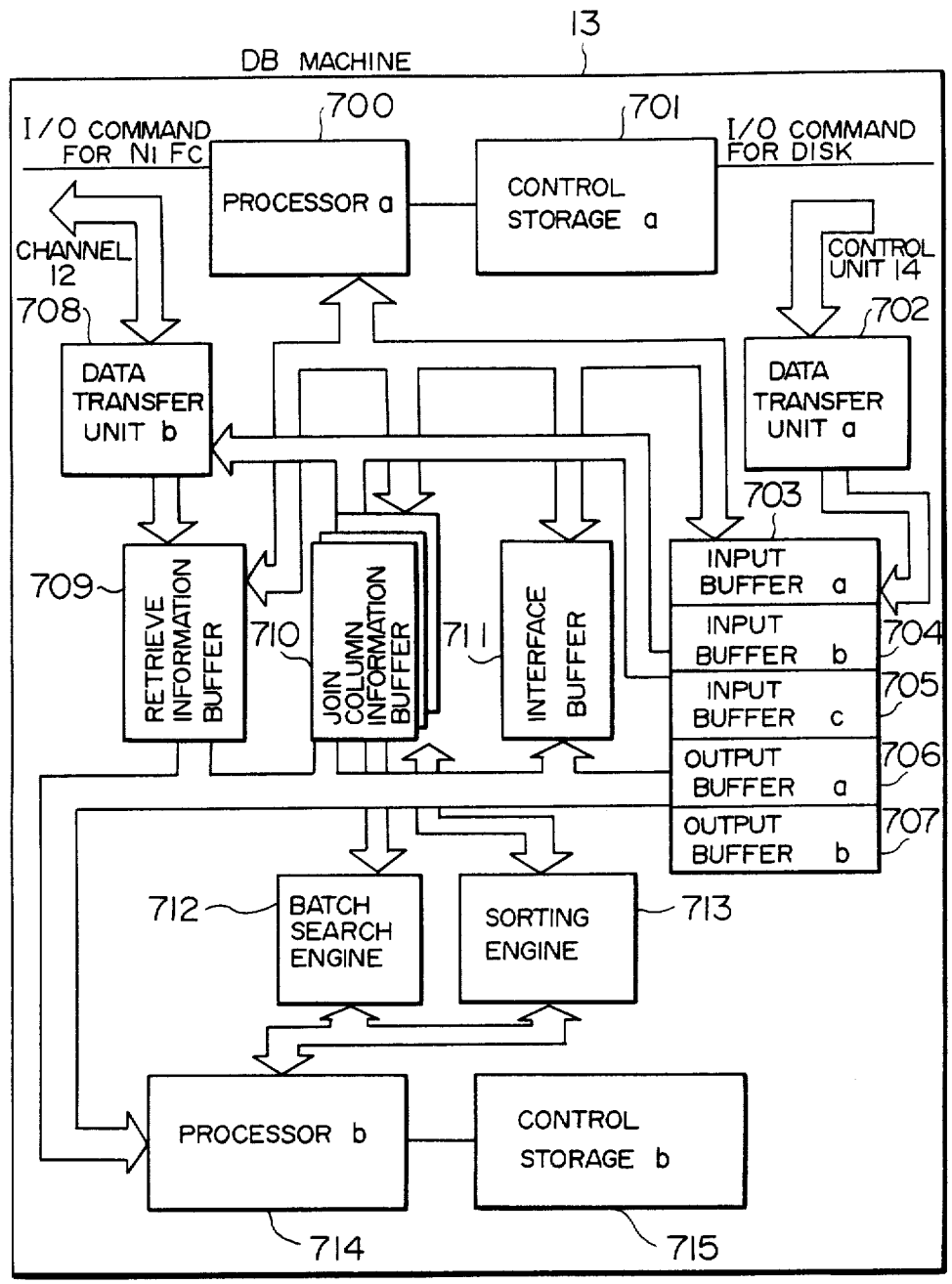
FIG. 7 shows a block diagram of the DB machine of the present invention.

FIG. 7 shows a configuration of the DB machine 12. A processor a 700 has functions for transferring data between the control unit 14 and the channel 13, extracting the specified column 31 of the row 30 which meets the condition, and preparing the join column information. A control storage a 701 is an internal memory of the processor a. Input buffer a 703, input buffer b 704 and input buffer c 705 store data sent from the disk unit 15. A unit of transfer to and from the disk unit 15 is called a block. One block is stored in each input buffer. The block stores a plurality of rows 31. Three buffers are provided to allow parallel operation of data base processing and data transfer from the disk unit 15.

Output buffer a 706 and output buffer b 707 store the specified columns 32 specified by the AP 21 of the selected row 41 which meets the specified condition. Two buffers are provided to allow parallel operation of the storing and the transfer to the channel 12.

Figure 8:
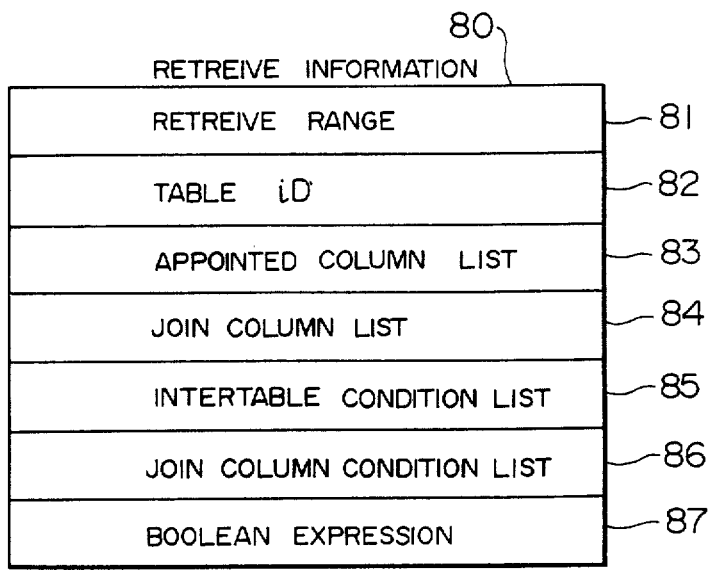
FIGS. 8 and 9 show formats of search information.
Figure 9:
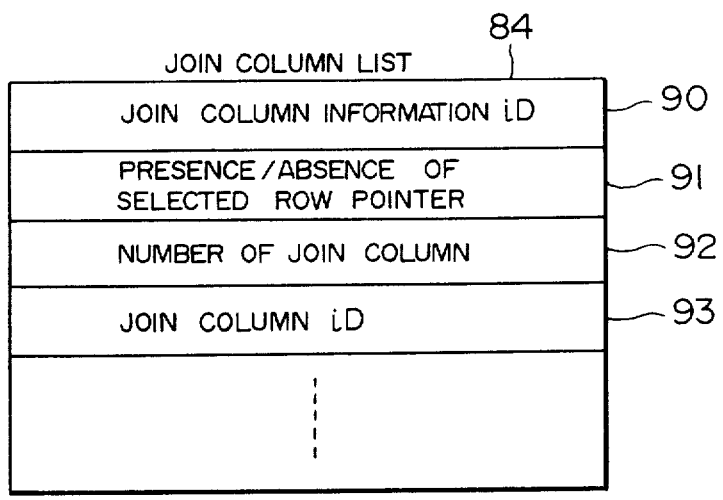
Figure 10A:
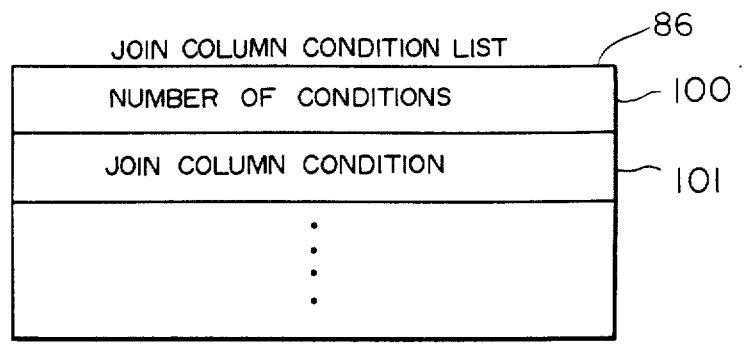
FIGS. 10(a) and 10(b) show formats of a join column condition list of the present invention, FIGS. 11(a) and (b) illustrate sorting of join column information of the present invention.
Figure 10B:
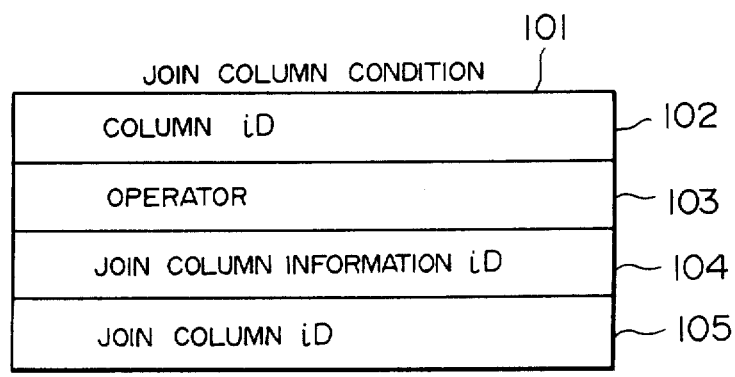

A retrieve information buffer 709 stores retrieve information 80 shown in FIG. 8 sent from the channel 13. This is explained below in detail. A retrieval range specifies a range of retrieval for the disk unit 15. A table ID 82 is an identifier of the table 30 to be retrieved. A specified column list 83 specifies a set of identifier of the specified column 42 to be delivered to the AP 22. Only the values of the columns 31 specified by the specified column list 83 are stored in the output buffers a 706 and b 707. A join column list 84 specifies a set of an identifier of the join column 121 to be extracted as the join column information 120. This is shown in detail in FIG. 9. The join column information ID 90 is an ID for the join column information. The presence/absence of selected row pointer 91 indicates whether or not a pointer to the selected row 41 extracted from the row is to be provided. The number of column 92 indicates the number of identifiers of the join column 121 to be listed in the join column list. The column ID 93 is an identifier of the join column 121 to be included in the join column information, and as many column ID's 93 as the number specified by the number of columns 92 are stored. The intertable condition list 85 is a list for the conditions of selection restriction in the row 31 of the table 30 to be retrieved. The join column condition list 86 is a list for the conditions of the column 32 to be joined with other table 30. This is shown in detail in FIG. 10. The number of conditions 100 indicates the number of conditions for the join column. A detail of the join column condition 101 is explained below. The column ID 102 specifies the join column for the table 30 to be retrieved. The operator 103 is an operator (=, ≠, >, etc.) among the join columns. The join column information ID 104 and the join column ID 105 correspond to the join column ID 90 and the join column ID 93 listed in the join column list 84 so that the DB machine 13 can determine a particular set or aggregation of values of the join column 121 of a particular table 30 to be processed. As many such conditions as the specified number of conditions 100 are specified. The Boolean expression 87 represents a logical relationship between the intertable condition list 85 and the join column condition list 86.

Figure 11A:
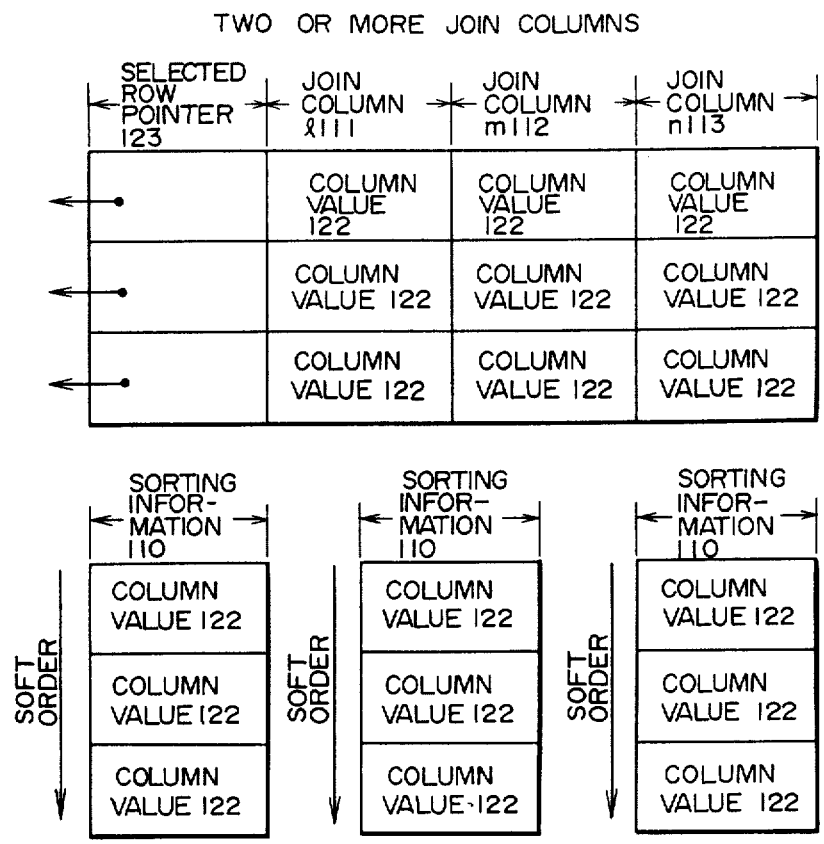
Figure 11B:
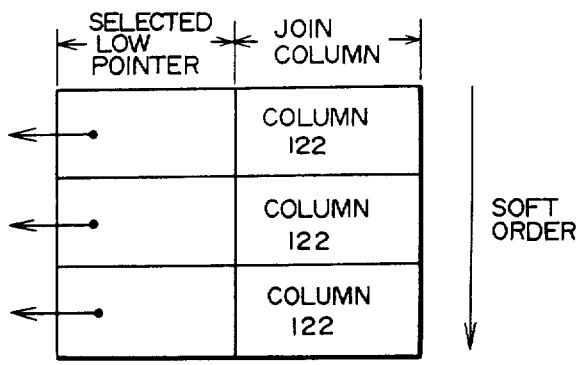

There are a plurality of join column information buffers 710 each of which stores the join column information 120. When a plurality of join columns 121 are included in one join column information, it is necessary to prepare sorting information for each join column 121 and store it in the join column information buffer 710. This is shown in FIG. 11(a). If the join column information 120 includes one join column 121, the entire join column information 120 is sorted as shown by FIG. 11(i b). Even if the retrieval in the retrieval range specified by the retrieval range 81 is completed, the join column information 120 is stored in the join column information buffer 710. This is because the above operation between the join column information 120 and the set of the values 122 of the join column 121 stored by a plurality of retrieval requests as to the other tables may be performed. Accordingly, if the join column information ID 90 has already been defined, the join column information 120 is added to the join column information buffer 710. In the present embodiment, when a transfer request of the join column information 120 to the main storage 11 is received, the join column information buffer 710 is released. Alternatively, a command for conveying a release request of the join column information buffer 710 may be provided. One or more batch search engine 712 is provided and it carries out an operation specified by the join column condition list 86. Since the operation includes a large amount of processing, each engine can perform only one operation in the present embodiment. However, if the amount of processing is small, a plurality of operations can be carried out in synchronism with the data transfer. If the search key matches some column values 122 in the sorted column 120, then the portions of the column values that match the search key are the output of this engine, otherwise the information that tells there is no match is the output of this engine. The sorting engine 713 prepares the sorting information 110 of the join column 121 of the specified join column information 120, or sorts the join column information 120.

The processor b 714 carries out the selection/restriction processing, that is, processing of the intertable condition list 85, controls the batch search engine 712, sets input data and determines selection of the selected row 41 based on the operation results of the two engines and the Boolean expression 87. It also controls the sorting engine 713. The control storage b is an internal memory of the processor b 714.

Figure 13:
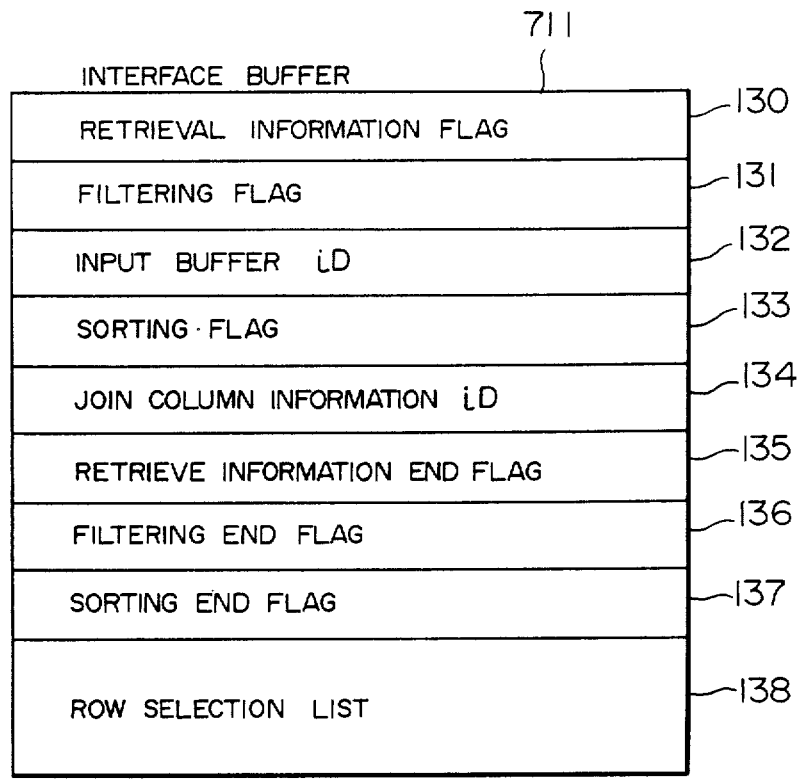
FIG. 13 shows information stored in an interface buffer of the present invention.

The interface buffer 711 is an interface buffer for the processor a 700 and the processor b 714. The interface information stored in this buffer is shown in FIG. 13. The retrieval information flag 130 indicates that the retrieval information has been stored in the retrieval information buffer 709. The filtering flag 131 indicates that a block which is a subject of selection/restriction has been stored in one of the input buffers a 703–c 705. The input buffer ID 132 is an identifier of the input buffer in which the above block is stored. The sorting flag 133 and the join column information ID 134 are identifiers of the join column information 120 in which the information to be sorted is stored. Those information 110 are conveyed by the processor a 700 to the processor b 714. The retrieval information end flag 135, filtering end flag 136 and sorting end flag 137 inform to the processor a 700 when the processor b 714 completes the respective processings. The row selection list 138 reports to the processor a 700 the selected row 41 in the block which meets the retrieval condition.

The data transfer unit a 702 supplies the input block transferred from the control unit 13 to a specified buffer in the input buffers a 703–c 705 in accordance with a command from the processor a 700. The data transfer unit b 708 transfers data between the buffer specified by the processor a 700, the output buffer a 706, the output buffer b 707, the retrieval information buffer 709 or the join column information buffer 710, and the channel 12.

The input block to the disk unit 15 is processed in a pipeline fashion. While the data transfer unit a 702 transfers the block into the input buffer a 703, the processor b 714 processes selection/ restriction operation as to the block stored in the input buffer b 704, processes operation with the join column of other table, and determines the row 41 to be selected from the rows 31 in the block. The processor a 700 stores the specified column 42 in the specified column list 82 from the entire selected row 41 specified for selection by the processor a 700, into the output buffer a 706 or b 707 in accordance with the block stored in the input buffer c 705 and the row selection list 138 which specifies the selected row 41 which meets the condition received from the processor b, and the processor a 700 stores the join column information 120 of the selected row 41 specified for selection by the processor a 700 into the join column information buffer 710. The above processing is cyclically carried out for the buffers a 703, b 704 and c 705.

Process flow charts of the processors a 700 and b 714 are explained below.

Figure 14:
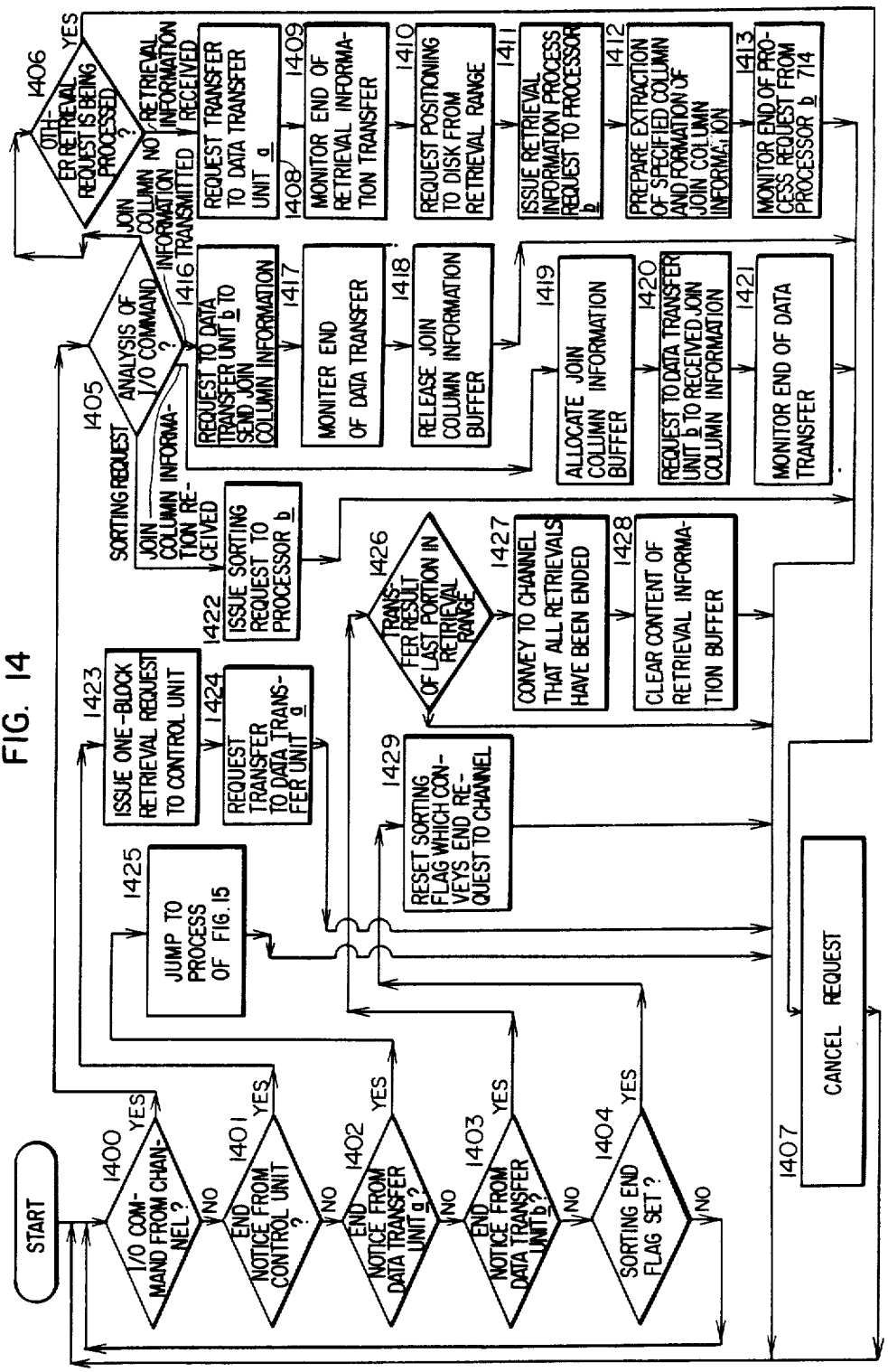
FIG. 14 shows a processing flow of a processor a of the present invention.

FIG. 14 shows the process flow of the processor a 700.

The processor a 700 starts the operation when it receives a positioning end notice from the I/0 command from the channel 12, an end notice from the data transfer unit a 702, an end notice from the data transfer unit b or a sorting end notice from the processor b 714. Those processings are performed in steps 1400–1404.

The operation carried out when the I/0 command is received from the channel 12 is first described. In the present embodiment, the DB machine 13 takes accounts of a receive request command of the retrieve information 80 from the channel 12, a communication request command of the output buffer a 706 or b 707 to the channel 12, communication request, receive request and sorting request commands of the join column information to the channel 12. The DB machine 13 also receives other requests but they are omitted here because they are not pertinent to the present invention. Since the request as to sending the output buffer to the channel 12 is received and processed in another step, only two types of requests are received here. The received command is analyzed in a step 1405.

Let us assume that a request to receive retrieve information is received In a step 1406, whether or not necessary retrieval information 80 is being processed is checked. If it is, the request is cancelled in a step 1407 and the process returns to the step 1400.

If necessary retrieval information is not being processed, the current information is transferred to the retrieval information buffer in a step 1408. In a step 1409, the end of the transfer is monitored. If an end notice is received, a positioning request of the disk unit 15 is issued to the control unit 14 from the retrieval range 81 in the retrieval information 80 in a step 1410. Then, in a step 1411, a retrieval information flag 130 is turned on to inform to the processor b 714 that the retrieval information has been stored in the retrieval information buffer 709. In a step 1412, a specified column list 83 and a join column list 84 of the retrieval information 80 are stored in the control storage a 701 to prepare for preparation of the specified column 42 and the join column information 120. In a step 1413, the end of the preparation by the processor b 714 is monitored. Upon end of the preparation, the process returns to the step 1400. Let us next assume that a communication request of the retrieval column information 120 is accepted. In a step 1416, a transfer request is issued to the data transfer unit b 708. In a step 1417, the end of transfer is monitored. Upon the end, the join column information buffer 710 in which the join column information has been stored is released in a step 1418. Then, the process returns to the step 700. When a receive request of the join column information 120 is received, the join column information buffer 710 is allocated in a step 1419. In a step 1420, a transfer request is issued to the data transfer unit b 708. In a step 1421, the end of transfer is monitored. Upon the end, the process returns to the step 700. If a sorting request of the join column information 120 is received, a sorting flag 133 is set in a step 1422 to store an identifier of the join column information 120 to be sorted into the join column information ID 134 and a sorting request is issued to the processor b 714. Then, the process returns to the step 700. Since the transfer buses of the channel 12, DB machine 13 and control unit 14 are free during the sorting, the process is returned to the step 700 to allow acceptance of a request which does not relate to the DB operation.

The process to be carried out when a positioning end notice from the control unit 13 is received. In a step 1423, a one-block retrieval request is issued to the control unit 14. In a step 1424, a one-block data transfer request and a request to supply to the input buffer a 703 are issued to the data transfer unit a 702. Then, the process returns to the step 1400.

Figure 15:
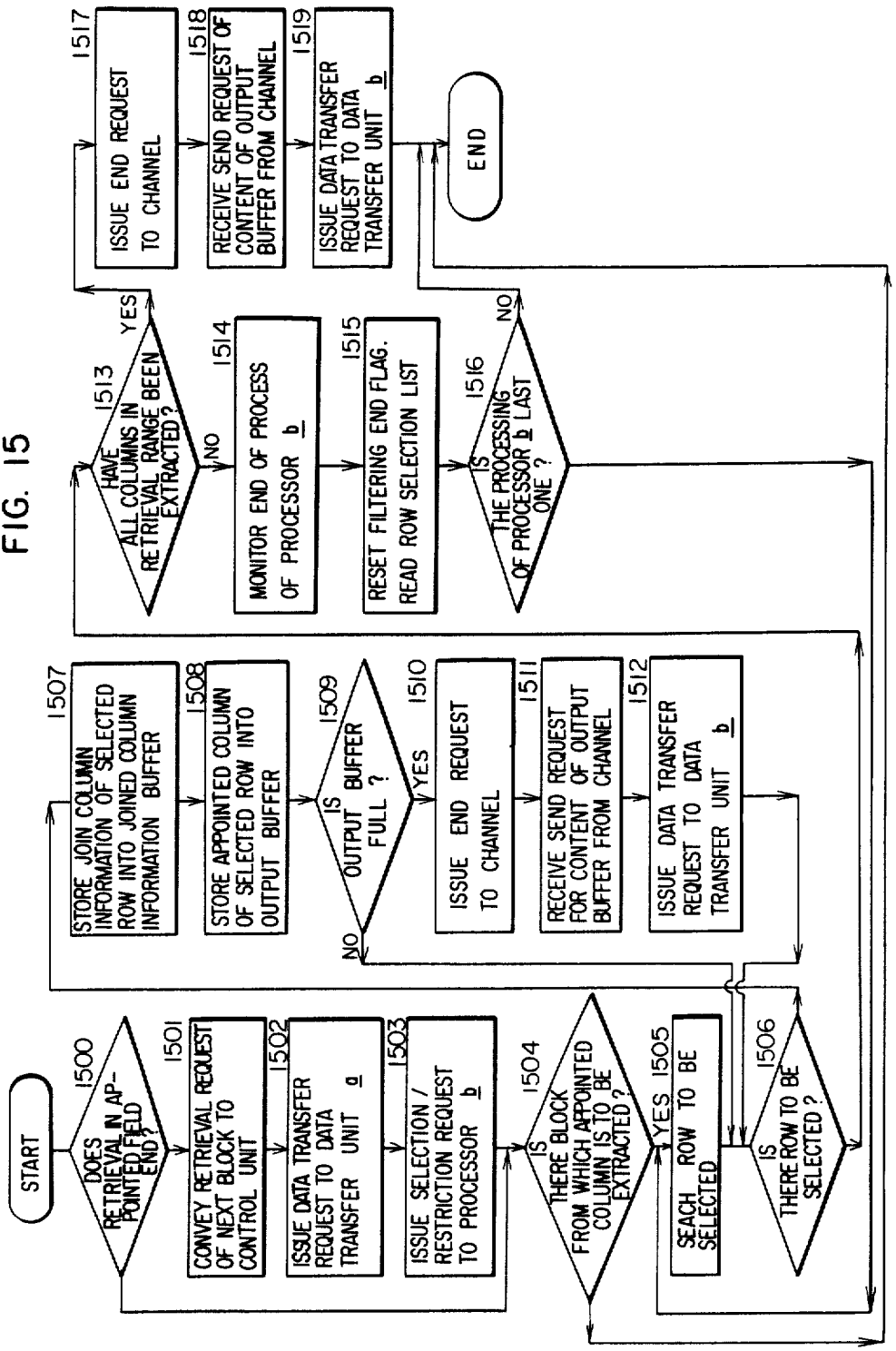
FIG. 15 shows a flow chart of projection processing of the present invention.

The process to be carried out when the data transfer from the data transfer unit a 702 is completed is explained. A detail thereof is shown in FIG. 15 and in a step 1425. In a step 1500, whether or not the data transfer in the specified retrieval range has been completed is checked. If it has, to process jumps to a step 1504. If it has not, a next block retrieval notice is sent to the control unit 13 in a step 1501. Then, a data transfer request is issued to the data transfer unit a 702. Since the buffer to which the data is to be transferred changes in rotation among the input buffers a 703, b 704 and c 705, the next buffer to the current buffer which has just completed the transfer is specified. The identifier of the buffer which has just completed the transfer is set in the input buffer ID 132, and the filtering flag 131 is set and a process request is issued to the processor b. In a step 1504, whether or not there is a block whose specified column is to be extracted, and if there is no such block, the process terminates. The extraction of the column 31 starts from a step 1505 In the step 1505, one selected row 41 having the selection designation is searched from the row selection list 138 stored in the control storage a 701. If there is no longer selected row 41 remained, the process jumps to a step 1513. This is judged in a step 1506. If there still is the row 31 having the selection designation, it is stored in a step 1507 into the join column information buffer 710 in accordance with the join column information. (If there is no need to prepare the join column information 120, it is not prepared.) In a step 1508, the specified column is stored into either the output buffer a 706 or the output buffer b 707 in which the join column information is currently stored. The output buffer a 706 and b 707 are used by turns. In a step 1509, whether the output buffer is full or not is checked. If it is not, the process jumps to the step 1506. If it is full, the termination of the previous I/0 command process is noticed to the channel 12. (In a plurality of continuous I/0 commands which are chained, the next command is usually sent from the channel 12 when the current command process is terminated.) In a step 1511, the next command is received Let us assume that the I/0 command to send the content of the output buffer to the channel 12 is received. The RDBMS 20 in the CPU issues the I/0 request, through the OS, by chaining an I/0 command to send the retrieval information to the DB machine 13 and a plurality of I/0 commands to receive the content of the output buffer from the DB machine 13. In a step 1512, the data transfer unit a 702 is started to specify to send the content of the output buffer to the channel. Then, the process returns to the step 1506.

Upon the end of the extraction of the specified column 42 of the selected row 41, whether all columns 31 in the retrieval range have been extracted or not is checked in a step 1513. If they have, the process jumps to a step 1517.

If they have not, an end notice from the processor b 714 is monitored in a step 1514. Upon the end, the filtering end flag 136 is reset and the row selection list 138 is written into the control storage a 701. In a step 1516, whether the block processed by the processor b 714 is the last block in the retrieval range or not is checked. If it is, the process jumps to a step 1504. If this condition is met, the data transfer unit a has already transferred the data in the retrieval range 81 and is not activated, and hence it is not necessary to monitor the termination of the data transfer unit a 702. If not all data have been transferred, the process is terminated.

Upon the end of the extraction of all columns in the retrieval range 81, it is necessary to send them to the channel 12 even if the output buffer is not full. Accordingly, the same steps as the steps 1510-1512 are carried out in steps 1517-1519, and the process is terminated.

A process to be carried out when an end notice from the data transfer unit b 708 is received. Since the end notices to the transfer of the retrieval information 80 and the join column information 120 are received in the steps 1409, 1417 and 1421, respectively, the end notice received now is the transfer end notice of the output buffer a 706 or the output buffer b 707. In a step 1426, whether the content of the output buffer which stores the retrieval result 708 of the last portion of the retrieval range 81 has been transferred or not is checked. If it has not, the process returns to the step 1400. If it has, it is noticed to the channel 12. It is not a conventional command end notice but it notifies that the command is no longer issued even if there is non-issued command. As described above, if a normal end notice is issued to the channel 12, the next I/0 command in the command chain would be issued. Then, the content of the retrieval information buffer 709 is cleared and the retrieval specified by the retrieval information is terminated.

Finally, a process to be carried out when a sorting end notice from the processor b 714 is received is explained. In a step 1429, an end notice is issued to the channel 12, and the sorting end flag 137 is reset. Then, the process returns to the step 1400.

Figure 16:
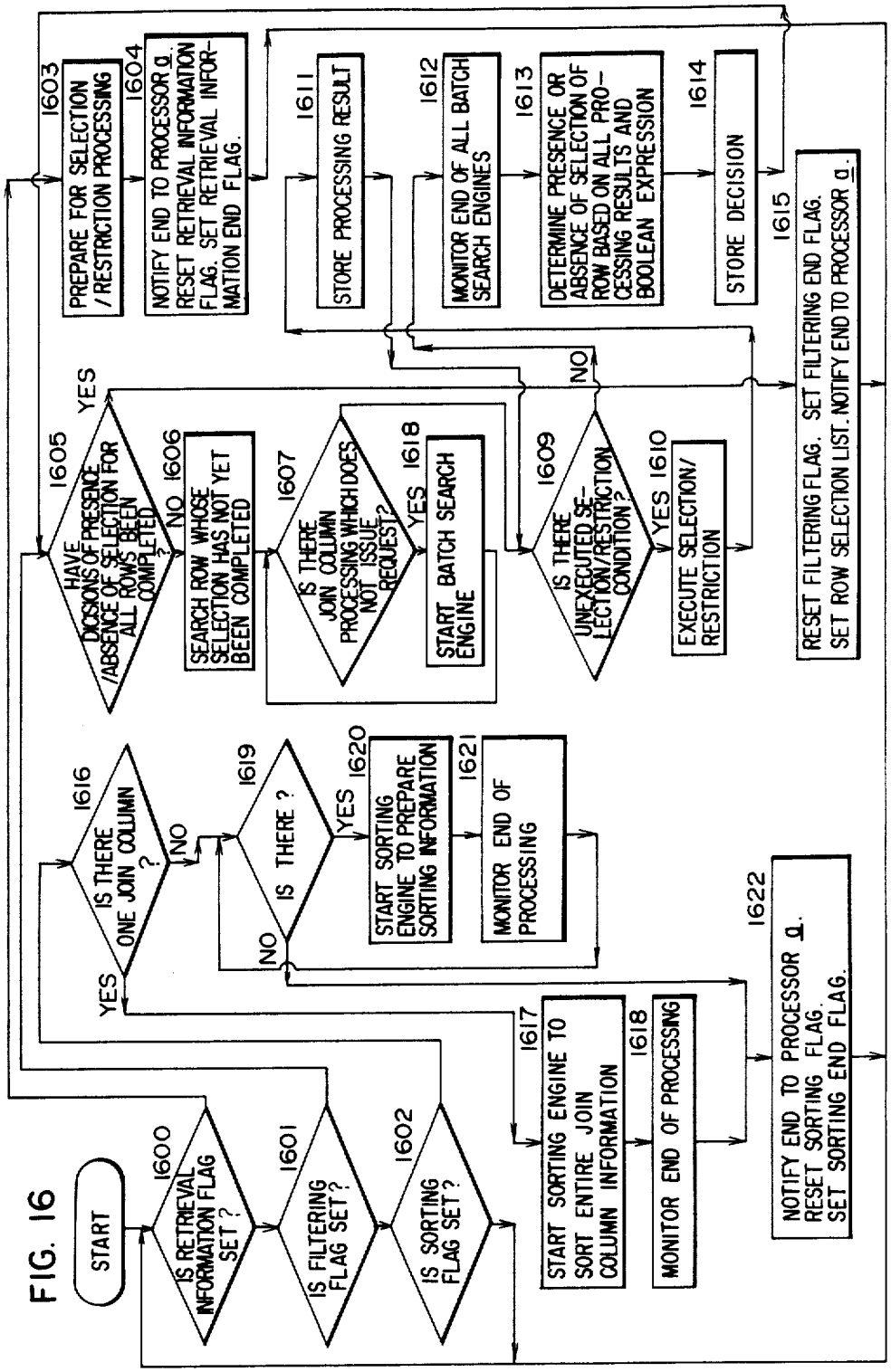
FIG. 16 shows a processing flow of a processor b of the present invention.

The process by the processor b 714 is now explained with reference to FIG. 16. The processor b 714 starts the operation when it receives the retrieval information process request, filtering request or sorting request from the processor a 700. The presence or absence of those requests is checked in steps 1600-1602.

A process to be carried out when the retrieval information flag 1300 is set is explained. In a step 602, the intertable condition 85, join column condition 81 and Boolean expression 87 in the retrieve information 80 in the retrieval information buffer 709 are examined to form in the control storage b 715 the information necessary for selection/restriction, processing with other set of other table join columns and row selection based on the result of the above processing. Thereafter, the retrieval information flag 130 is reset, the retrieval information end flag 135 is set and the end of processing is reported to the processor a 700.

A process to be carried out when the filtering flag 131 is set is explained. The presence or absence of selection of the row 31 in the block stored in the input buffer specified by the input buffer ID 132 is checked. In a step 1605, whether the presence or absence of selection of all rows has been checked or not is checked. If it has, the process jumps to a step 1615. In a step 1606, the row 31 for which the presence or absence of selection is to be checked is selected from uncompleted rows 31. In a step 1607, whether there is a condition to the non-started other table join column or not is checked. If there is no condition, the process jumps to a step 1609. In a step 1608, the batch search engine to be started is selected and it is started. An identifier of the join column information buffer 710 in which the column number 122 of the join column 121 on the table to be searched and a set of column numbers 122 of the join columns 121 of other tables are stored, is delivered to the engine. Then, the process returns to the step 1607 to check whether or not there is a condition to the other table join column 121 to be further executed.

After the batch search engine 712 has been started, the selection/restriction process is started from the step 1609. In the step 1609, where or not there still is a selection/restriction condition which is not yet executed is checked. If there is no such condition, the process jumps to a step 1611. If there are, one of the conditions is selected and it is executed in a step 1610.

In a step 1611, the result of the condition is stored. Then, the process jumps to the step 1609 to check whether or not there is a condition which has not yet been executed.

After all selection/restriction processings have been completed, the end of the process by all of the batch search engines started in the step 1609 is monitored. Upon the end, whether the row 30 is to be selected or not is checked in a step 1613 based on the results of processings and the information of the Boolean expression 87 stored in the control storage b 715. The decision is stored in the control storage b 715 in a step 1614, and the process returns to the step 1605 to check where or not there is the row 31 for which the presence or absence of the selection has not been checked.

After the selection processing for all rows 31 in the block has been completed, the results of the presence/absence decision of selection for all rows 31 in the block are stored in the row selection list 138 in a step 1615. Then, the filtering flag 131 is reset, the filtering end flag 136 is set and the end of process is informed to the processor a 700.

Finally, a process to be carried out when the sorting flag 133 is set is explained. In a step 1616, the join column information 120 to be sorted is examined from the join column information ID 134, and whether the join column to be sorted is one or more is checked. If it is not one, the process jumps to a step 1622. If it is one, a request is issued to the sorting engine 713 in a step 1617 to sort the entire join column information 120. In a step 1618, the end of sorting is monitored. Upon the end, the process jumps to a step 1622.

If there are two or more join columns, whether or not there is a join column 121 which has not yet been sorted is checked in a step 1619. If there is no such join column, the process jumps to a step 1622. If there is, one join column 121 to be sorted is selected and a request is issued to the sorting unit to prepare the sorting information 111 for the join column 121. In a step 1621, the end of preparation is monitored. Upon the end, the process returns to a step 1619 to check whether or not there is a join column 121 which has not yet been sorted.

After all of the join columns 121 have been sorted, the sorting flag 133 is reset, the sorting end flag 134 is set and the end of the process is informed to the processor b 714 in a step 1622.

In accordance with the present invention, since most portions of joining process of a plurality of tables can be included in the data transfer time, the burden of the CPU can be significantly reduced. In the relational DB operation, the joining of the tables is important in deciding the performance and the present invention which improves this issue provides a significant advantage.

A second embodiment of the present invention is now explained in detail.

In searching a key word sequence, a binary search method has been well known. However, this search method pays no attention to the duplication of the key word sequence. For example, in a set operation, whether two key word sequences totally match or partially match (inclusion) is checked and the number of matching in the set operation is checked. In such a case, there may be duplication in the key word sequence. Joining may also be frequently carried out between duplicated key sets. In those operations, searching is a basic operation and a frequency of use is high. In the past, after the searching is executed twice, a store range is determined, or after the searching is executed once, the store range is sequentially determined.

It is an object of the present invention to determine the store range by one searching.

The key word sequence to be searched is stored in an ascending or descending order. It is now assumed that the key word sequence is stored in the ascending order. The key word sequence may be a linearly addressed memory structure and it does not use a special memory structure (memory bank structure) as shown in Japanese patent application No. 59-173310. In order to determine the store range in one searching, an area in which the key word sequence is stored is addressed by m bits, and the corresponding bits are set to "1" starting from the high order bit of the m bits. A key word at a store address of the key word sequence specified by the m bits is compared with a search key. If the search key is larger, the corresponding bit is set to "1", and if not, it is set to "0". In this manner, a maximum address is determined in the range of area which stores the key word which meets the condition that the key word is smaller than the search key. On the other hand, the corresponding bits are sequentially set to "1" starting from the high order bit of the m bits, and the key word at the store address of the key word sequence specified by the m bits Is compared with the search key. If the search key is larger, the corresponding bit is set to "0". In this manner, a maximum address is determined in the range of area which stores a key word which meets a condition that the key word is smaller than or equal to the search key. Those two processes are parallelly carried out. As a result, the store range can be determined by one searching.

In order to address the keyword, an output flag of comparison of the key word and the search key is set by bit manipulation. As a result, the searching is attained by two comparators, two address registers and a bit manipulation circuit.

The third embodiment of the present invention is now explained in detail.

Figure 17:
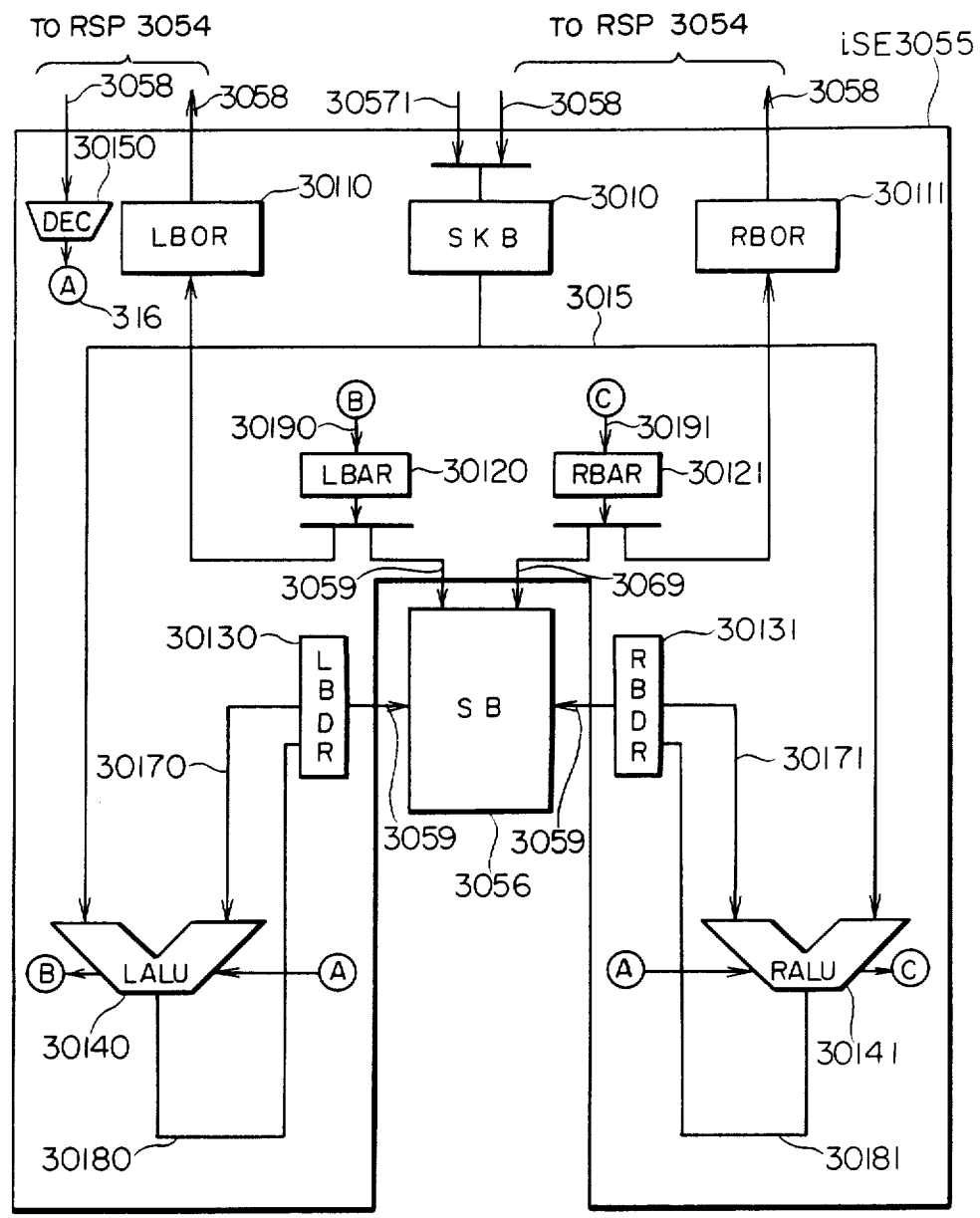
FIG. 17 shows a block diagram of an interval search engine of a second embodiment of the present invention.

FIG. 17 shows a configuration of an interval search engine (ISE). The ISE 3055 is most suitable to show the feature of the embodiment and it will be explained in detail later.

Figure 18:
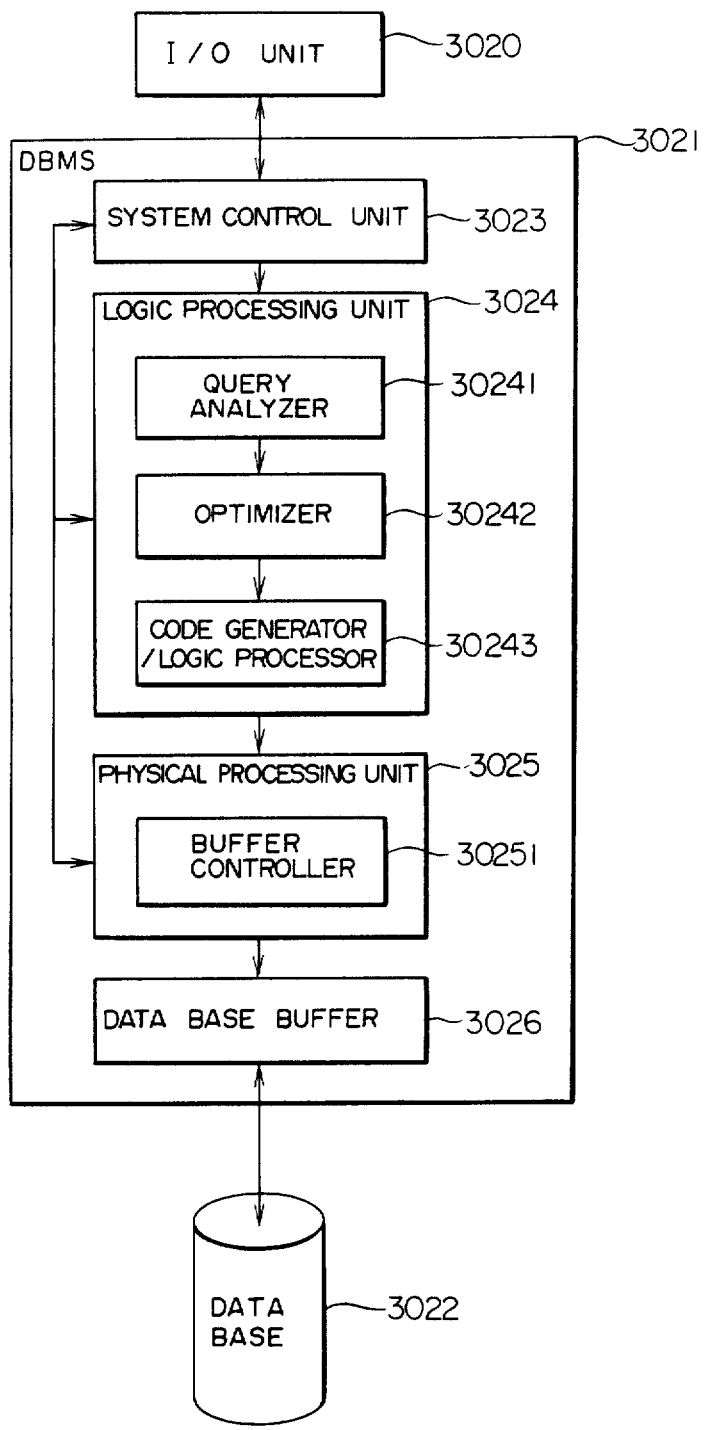
FIG. 18 shows a block diagram of a data base to which the present invention is applied.

FIG. 18 shows a configuration of a data base system to which the present invention is applied. The data base system comprises an I/O unit 3020 for executing query inputs from users and output for the result of processing of the query input, a DBMS 3021 for managing query processing and the entire data base such as resource management, and a data base 3022 which stores data of the data base. The DBMS 3021 comprises a system control unit 3023 which manages and controls the overall system and also manages the input/output, a logic processing unit 3024 including a query analysis unit 30241 which carries out query syntax analysis and semantic analysis, an optimize unit 30242 which generates an optimum internal procedure and a code generation/logic processing unit 30243 which generates an internal code and interpret the code, and a physical processing unit 3025 which executes physical processing of the data base such as a buffer control unit 30251 which manages a data base buffer 3026 which stores the data to be processed by the DBMS.

Figure 19:
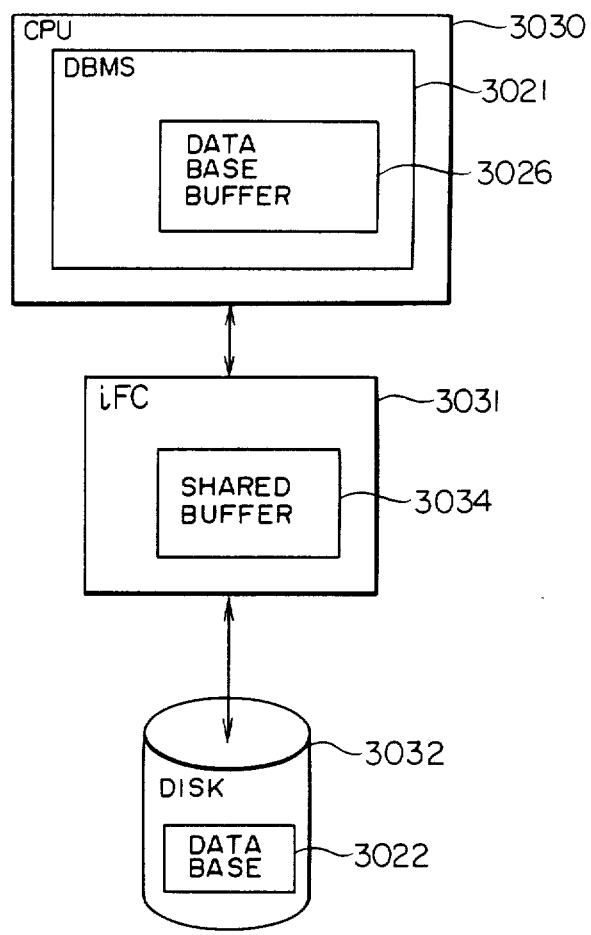
FIG. 19 shows a block diagram of one form by which a data base management system of the present invention is implemented.

FIG. 19 shows an embodiment to implement the DBMS 3021 shown in FIG. 18. It comprises a central processing unit (CPU) 3030, an intelligent file control unit (IFC) 3031 and a disk 3032. A DBMS 3021 for managing a data base buffer 3026 is set in the CPU 3030. The IFC 3031 includes a shared buffer 3034. The disk (DK) 3032 stores a data base 3022. This arrangement is different from a system in which all data base processings are carried out by the DBMS 3021 in the CPU 3030. Namely, the IFC 3031 carries out relational algebra (selection, restriction, projection, joining, etc.) corresponding to internal processing code generated by the code generation/logic processing unit 30243 of the DBMS 3021. This arrangement corresponds to a unit (for example, filtering unit) which adds various operations to the I/O devices, known as a prior art system. The basic operation thereof is shown below.

(1) A user query is analyzed by the DBMS 3021 to determine operation procedure.

(2) A relative algebra is extracted in accordance with the procedure, and a process request is issued to the IFC 3031.

(3) The process request is analyzed and a physical I/0 request is issued to the disk 3032. The data base 3022 is a base relation, and a page which is a unit of management is read in synchronism with the rotation of the disk 3032 and is set into the shared buffer 3034.

(4) For the data of the shared buffer 3034, selection, restriction, projection or joining is carried out (filtering).

(5) The process result is set into the data base buffer 3026 of the DBMS 3021.

(6) The DBMS 3021 modifies the process result to produce a result to query to the user.

The processings (3), (4) and (5) are carried out in an overlapped manner (on-the-fly) or in an non-overlapped manner, as is known in the art.

Figure 20:
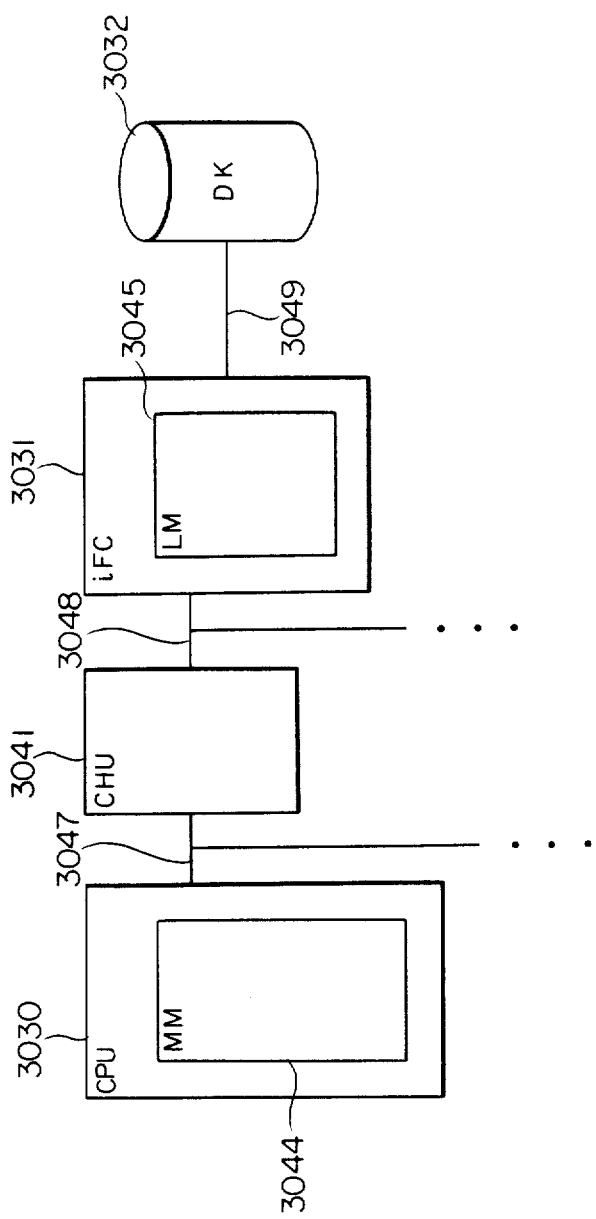
FIG. 20 shows a configuration of a hardware of the present invention.

FIG. 20 shows a hardware configuration which implements the present invention. It comprises a CPU 3030 including a main memory (MM) 3044, a channel (CHU) 3041 for controlling input/output, an IFC 3031 including a local memory (LM) 3045 for setting data to be selected, restricted, projected or joined in the data base processing, and a disk (DK) 3032. A relative block address and an I/0 data are transferred between the IFC 3031 and the DK 3032 through a line 3049. A filtering result is transferred between the CHU 3041 and the IFC 3031 through a line 3048. A line 3047 is used to transfer data and exchange control information between the CPU 3030 and the CHU 3041. a plurality of CHU's and IFC's may be coupled to the lines 3047 and 3048, respectively. The CHU and the IFC may be integrated in one modification of the system. In the following description, the system comprises one CPU, one CHU, one IFC and one DK.

Figure 21:
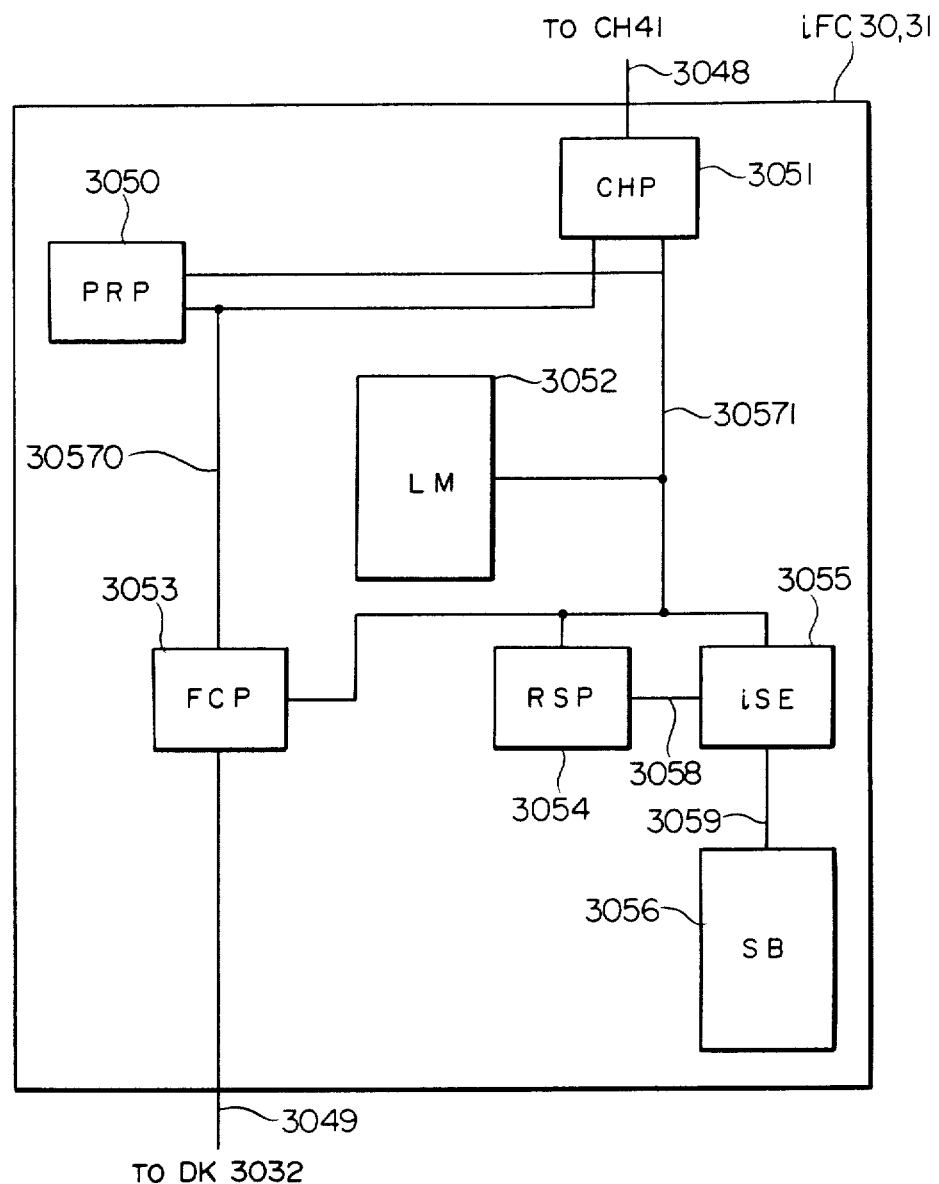
FIG. 21 shows a block diagram of an intelligent file control unit of the present invention, FIGS. 22(a) and (b) show a searching process of the present invention, and FIGS. 23(a) and (b) show a flow chart of the search process of the present invention.

FIG. 21 shows a block diagram of the IFC 3031. The IFC 3031 is coupled to the CHU 3041 through the line 3048, and to the DK 3032 through the line 3049. The IFC 3031 comprises a projection processor (PRP) 3050, a channel processor (CHP) 3051 which functions as an interface to the CHU 3041, a LM 3052 which stores a data to be processed by the IFC 3051, a file control processor (FCP) 3053 which functions as an interface to the DK 3032, a selection/control processor (RSP) 3054, an interval search engine (ISE) for carrying out joining, and a search buffer (SB) 3056 which stores sorted key words to be searched by the ISE 3055. A line 30570 couples the CHP 3051, PRP 3050 and FCP 3053 and is a data transfer line for data which is not subject of filtering. A line 30571 couples the PRP 3050, CHP 3051, LM 3052, FCP 3053, RSP 3054 and ISE 3055 and is a data transfer line for data to be filtered. The ISE which carries out the joining is now explained in detail.

The ISE searches data at a high speed. The key words which are data to be searched are arranged in ascending or descending order. Let us now assume that they are arranged in the ascending order. The searching is to previously store key words, compare the key words with a search key and determine a range of store addresses of the key words which match to the search key.

Figures 22A, 22B:
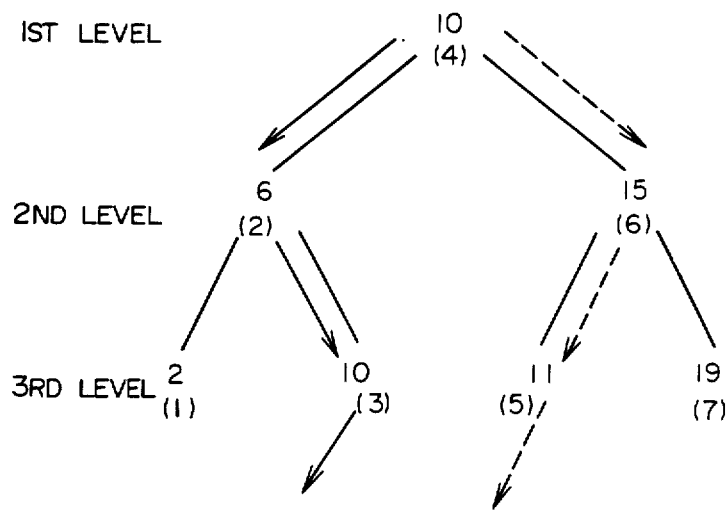

FIG. 22 shows the searching. A key word sequence 3060 is stored in ascending order as shown in FIG. 22(a). In the illustrated example, the key words "2", "6", "10", "10", "11", "15" and "19" are stored at the addresses 1 to 7. The search process is explained with reference to FIG. 22(b). The address at which the key word is stored is shown in the parenthesis. The illustrated searching method is basically a binary search method. A binary tree (BT) is suitably used to represent the search process. A depth or level of the BT is three. Accordingly, the number of times of search is three. A first level contains "10", a second level contains "6" and "15", and a third level contains "2", "10", "11" and "19". The ISE search process is specifically explained. The process starts from a root node of the BT, that is, the first level of FIG. 22(b) and advances towards a leaf node. As a result, a range of addresses having key words which are equal to the search key is determined. In FIG. 22(b), the search key is "10", and procedure to trace the BT in the searching is shown by solid lines and broken lines. The solid lines show a process to determine a biggest address having a key word which is smaller than the search key, and the broken lines show a process to determine a maximum address having a key word which is smaller than or equal to the search key. In the solid lines, the key word "10" of the first level is compared with the search key "10", and since they are equal, the left line of the BT is traced. The key word "6" of the second level is compared with the search key "10", and since the search key is larger, the right line of the BT is traced. Finally, the key work "10" of the third level is compared with the search key "10". Since they are equal, the left line of the BT is traced. As a result, the left line, right line and left line are traced. The left corresponds to "0" and the right corresponds to "1". It is thus seen that the key words which are equal to the search key are stored at addresses higher than an address $010_2$ (=2). This address is called a left boundary. Similarly, in the broken line, the key word "10" of the first level is compared with the search key "10". Since they are equal, the right line of the BT is traced. Then, the key word "15" of the second level is compared with the search key "10". Since the key word is larger, the left line of the BT is traced. Finally, the key word "11" of the third level is compared with the search key "10". Since the key word is larger, the left line of the BT is traced. As a result, the right line, left line and left line of the BT are traced. The left corresponds to "0" and the right corresponds to "1". It is thus seen that the key words which are equal to the search key are stored up to an address $100_2$ (=4). This address is called a right boundary. The left boundary is smaller than or equal to the right boundary. While the three-level BT has been shown, an n-level BT may be similarly implemented.

In accordance with the above search process, in the 2-way join $T_1 \theta T_2$ (where $T_1$ and $T_2$ are relations), the join columns of $T_1$ are extracted and sorted in an ascending order (while permitting duplication of keys) to produce a key word sequence, and the join columns of $T_2$ are sequentially extracted to produce a search key. In the above sequence, a $\theta$-join ($\theta = \{=, \neq, \geq, >, \leq, <\}$) is attained by use of an address range of a key word which matches with the search key (where $\theta$ is a join operator which represents a pair which meets $T_1.C_1 \theta T_2.C_2$ where $C_1$ and $C_2$ are join column of relations $T_1$ and $T_2$, respectively).

Figure 23A:
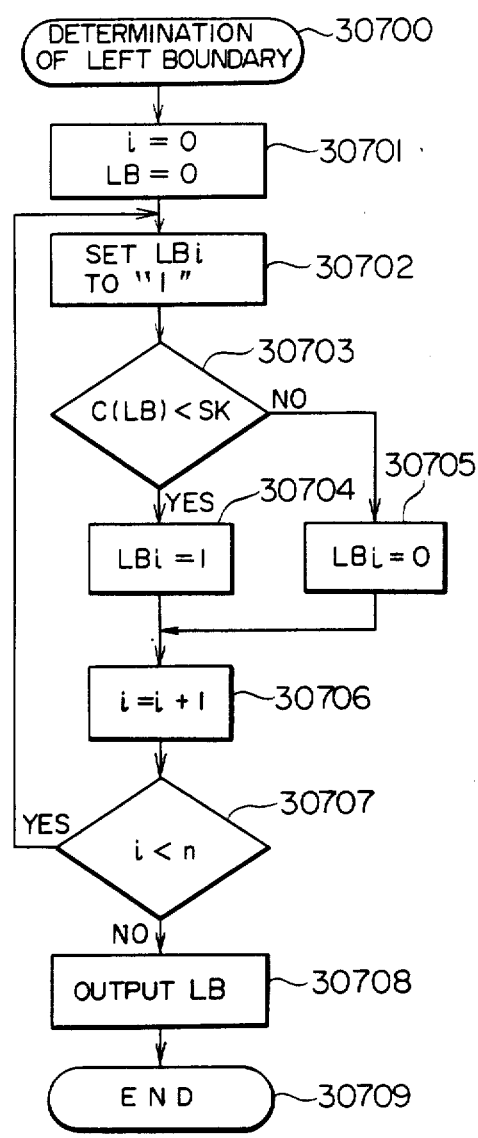
Figure 23B:
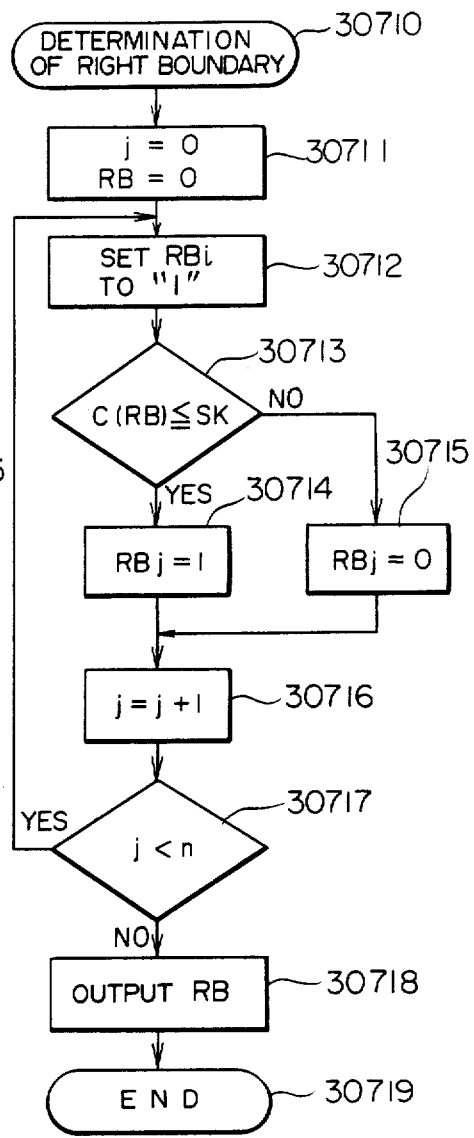

FIG. 23 shows a flow chart of a process for determining the left boundary and the right boundary. FIG. 23(a) shows a process 30700 to determine the left boundary, and FIG. 23(b) shows a process 30710 to determine the right boundary. Notation used in the flow charts is first explained. SK is the search key, LB is the left boundary, RB is the right boundary, n is the number of bits of LB or RB, LBi and RBj are the i-th and j-th bits (where $0 \leq i, j \leq n-1$) from the MSB's of the LB and RB, respectively, and C (LB) and C (RB) are contents of the key words stored at the addresses LB and RB, respectively. In the left boundary determination process 30700, the i and LB are initialized to zero, and the i-th bit of the LB is set to "1" (30701, 30702). The content of the key word addressed by the LB is compared with the SK (30703). If the SK is larger, the i-th bit of the LB is set to "1" (30704), and otherwise, the i-th bit of the LB is set to "0" (30705). Then, i is incremented by one (30706) and i and n are compared (30707). If n is smaller than i, the process returns to 30702, and otherwise, the LB is outputted (30708, 30709). In the right boundary determination process 30710, the j and RB are initialized to zero, and the j-th bit of the RB is set to "1" (30711, 30712). The content of the key word addressed by the RB is compared with the SK (30713), and if the SK is equal to or larger than the content, the j-th bit of the RB is set to "1" (30714), and otherwise the j-th bit of the RB is set to "0" (30715). Then, j is incremented by one (30716), j and n are compared (30717), and if n is smaller than j, the process returns to 30712, and otherwise the RB is outputted (30718, 30719). The left boundary determination process 30700 and the right boundary determination process 30710 of the search process can be parallelly executed. In the ISE, the parallel searching is carried out.

The configuration of the ISE 3055 is explained in detail. The ISE 3055 is coupled to the RSP 3054 through the path 3058, coupled to the LM 3052 through the path 30571, and the SB 3056 through the path 3059. The path 3058 is used to transfer the address range in which the search key extracted from the RSP 3054 and the key word which is equal to the search key are stored. The path 30571 is used to transfer data to set the key word sequence sorted in the ascending order in the SB 3056 prior to the searching. A search key buffer (SKB) 3010 latches the search key, a left boundary output register (LBOR) 30110 and a right boundary output register (RBOR) 30111 supply the address range in which the key word equal to the search key is stored, to the RS 3054, and a left boundary address register (LBAR) 30120 and a right boundary address register (RBAR) 30121 specify the address of the key word to be compared with the search key in accordance with the searching. A left boundary data register (LBDR) 30130 and a right boundary data register (RBDR) 30131 hold the data to be transferred to and from the address on the SB 3056 specified by the LBAR 30120 and the RBAR 30121. A left arithmetic and logic unit LALU and a right arithmetic and logic unit RALU compare the search key with the key words. A decoder (DEC)

30150 decodes the control information specified by the RSP 3054 to set the function codes of the LALU 30140 and the RALU 30141.

An overall operation is explained for a specific embodiment. In FIG. 22(a), the key word sequence 3060 is set in the SB 3056 and only "10" is extracted from the RSP 3054 as the search key. Referring to FIGS. 17, 22(a) and 23, the left boundary and the right boundary are parallelly determined to synchronize the comparison of the key word and the search key. Step 0:

As an initial state, the key word sequence of the addresses 1-7 (2, 6, 10, 10, 11, 15, 19) is set in the SB 3056 as shown in FIG. 22(a). The number n of comparison of the key words and the search key is equal to 3 ($2^{n-1} < l \leq 2^n$ where l is the number of stored key words). The start of searching is instructed from the RSP 3054 to the DEC 30150 through the path 3058. It is decoded by the DEC 30150 and the function code is set in the LALU 30140 and the RALU 30141 through the path 3016. The search key 10 is set in the SKB 3010 from the RSP 3054 through the path 3058. Then, the LBAR 30120 and the RBAR 30121 are set to "0" (30701 and 30711).

The i of the left boundary determination 30700 and the j of the right boundary determination 30710 can be incremented and compared by the LALU 30140 and the RALU 30141, respectively. The information are shown by i and j.

In this step, i and j are zero.

Step 1

The O-th bit of the LBAR 30120 is set to "1" (LBAR = $100_2$ (=4) (30702). The search key "10" is supplied from the SKB 3010 to the LALU 30140. The content "10" of the LBAR 30120 (address 4) is read into the LBDR 30130 from the SB 3056. The key word "10" is supplied from the LBDR 30130 to the LALU 30140. The LALU 30140 compares the search key and the key word (30703), and since they are equal, a flag "0" is set at the O-th bit of the LBAR 30120 from the LALU 30140 through the path 30190. (LBAR = $000_2$ (address 0)) (30705). The i is incremented since it is smaller than 3 (30706, 30707), the process goes to 30702. The O-th bit of the RBAR 30121 is set to "1" (RBAR = $100_2$ (address 4)) (30712). The search key "10" is supplied to the RALU 30141 from the SKB 3019. The content "10" of the RBAR 30121 (address 4) is read from the SB 3056 to the RBDR 30131. The key word "10" is supplied from the RBDR 30131 to the RALU 30141. The RALU 30141 compares the search key and the key word (30713), and since they are equal, a flag "1" is set to the O-th bit of the RBAR 30121 from the RALU 30141 through the path 30191 (RBAR = $100_2$ (address 4)) (30714). The j is incremented (j=1), and since it is smaller than 3 (30716, 30717), the process goes to the step 30712.

Step 2:

The first bit of the LBAR 30120 is set to "1" (LBAR = $010_2$ (address 2)) (30702). The search key "10" is supplied from the SKB 3010 to the LALU 30140. The content "6" of the LBAR 30120 (address 2) is read from the SB 3056 into the LBDR 30130. The key word "6" is supplied from the LBDR 30130 to the LALU 30140. The LALU 30140 compares the search key and the key word (30703), and since the search key is larger than the key word, a flag "1" is set to the first bit of the LBAR 30120 from the LALU 30140 through the path 30190 (LBAR = $010_2$ (address 2)) (30704). The i is incremented (i=2), and since it is smaller than 3 (30706, 30707), the process goes to 30702. The first bit of the RBAR 30121 is set to "1" (RBAR = $110_2$ (address 6)) (30712). The search key "10" is supplied from the SKB 3010 to the RALU 30141. The content "15" of the RBAR 30121 (address 6) is read from the SB 3056 into the RBDR 30131. The key word "15" is supplied from the RBDR 30131 to the RALU 30141. The RALU 30141 compares the search key and the key word (30713). Since the search key is smaller than the key word, a flag "0" is set from the RALU 30141 to the first bit of the RBAR 30121 through the path 30191 (RBAR = $100_2$ (address 4)) (30715). The j is incremented (j=2), and since it is smaller than 3 (30716, 30717), the process goes to 30712.

Step 3:

The second bit of the LBAR 30120 is set to "1" (LBAR = $011_2$ (address 3)) (30702). The search key "10" is supplied from the SKB 3010 to the LALU 30140. The content "10" of the LBAR 30120 (address 3) is read from the SB 3056 into the LBDR 30130. The key word "10" is supplied from the LBDR 30130 to the LALU 30140. The LALU 30140 compares the search key and the key word (30703), and since they are equal, a flag "0" is set into the second bit of the LBAR 30120 from the LALU 30140 through the path 30190 (LBAR = $010_2$ (address 2)) (30705). The i is incremented (i=3), and since it is equal to "3" (30706, 30707), the process goes to 30708. The second bit of the RBAR is set to "1", (RBAR = $101_2$ (address 5)) (30712). The search key "10" is supplied from the SKB 10 to the RALU 30141. The content "11" of the RBAR 30121 (address 5) is read from the SB 3056 into the RBDR 30131. The key word "11" is supplied from the RBDR 30131 to the RALU 30141. The RALU 30141 compares the search key and the key word (30713), and since the search key is smaller than the key word, a flag "0" is supplied from the RALU 30141 to the second bit of the RBAR 30121 through the path 30191 (RBAR = $100_2$ (address 4)) (30715). The j is incremented (j=3) and since it is equal to "3" (30716, 30717), the process goes to 30718.

Step 4:

The contents of the LBAR 30120 and the RBAR 30121 are transferred to the LBOR 30110 and the RBOR 30111, respectively. The contents of the LBOR 30110 and the RBOR 30111 which indicate the address range of the SB 3056 in which the key words which is equal to the search key are stored are transferred to the RSP 3054 through the path 3058.

In this manner, the searching is completed.

The second embodiment of the present invention is applicable to the searching which is a basic operation in the set operation and the joining. The search processing unit may be incorporated in a specialized processor. Search operations such as searching and joining may be implemented in the configuration of a plurality of the above processors.

While the present invention is embodied by the hardware, it may also be implemented by software means.

What is claimed is:

1. A method for processing a data base in an information processing system having a memory unit for storing tables each having columns and rows of data and at least one data base processing unit, comprising the steps of:
   transferring a table from said data base to said memory unit and storing contents of columns of said table specified in an operation to be performed by said information processing system into an internal memory in said data base processing unit;

reading another table to be joined with said table from said data base; and storing contents of columns of said another table to be joined with said table into said internal memory in said data base processing unit in synchronism with said reading step.

2. A method for processing a data base in an information processing system having a memory unit for storing tables each having columns and rows of data and at least one data base processing unit, comprising the steps of:

transferring a table from said data base to said memory unit and storing contents of columns of said table specified in an operation to be performed by said information processing system into an internal memory in said data base processing unit;

reading another table to be joined with said table from said data base;

storing contents of columns of said another table to be joined with said table into said internal memory in said data base processing unit in synchronism with said reading step; and adding addresses of rows which cross said columns of said table transferred to said memory unit to said contents of said columns of said tables in said internal memory in said data base processing unit, said addresses being one of said memory unit storing said rows.

3. An apparatus for processing a data base having tables, each having columns and rows of data, in a computer system comprising:

(a) a CPU;

(b) a main memory unit for storing tables;

(c) an auxiliary memory unit for storing tables as said data base; and (d) a data base processing unit connected to said CPU, said main memory unit and said auxiliary memory unit, including (d-1) first means for transferring a table from said auxiliary memory unit to said main memory unit, (d-2) second means for storing columns of said table specified in an operation to be performed by said apparatus into an internal memory in said data base processing unit, (d-3) third means for reading another table to be joined with said table from said auxiliary memory unit, and (d-4) fourth means for storing columns of said another table into said internal memory in said data base processing unit during the reading of said table by said third means.

4. An apparatus for processing a data base, in a computer system comprising:

(a) a CPU;

(b) a main memory unit for storing tables;

(c) an auxiliary memory unit for storing tables, each having columns and rows of data, as said data base; and (d) a data base processing unit connected to said CPU, said main memory unit and said auxiliary memory unit, including (d-1) first means for transferring a table from said auxiliary memory unit to said main memory unit, and (d-2) second means for storing columns of said table specified in an operation to be performed by said apparatus into an internal memory in said data base processing unit, (d-3) third means for reading another table to be joined with said table from said auxiliary memory unit, and (d-4) fourth means for storing columns of said another table into said internal memory in said data base processing unit during the reading of said table by said third means; and wherein said fourth means comprises means for storing contents of columns of said table, which cross rows satisfying a specified condition and which are specified in an operation to be performed by said apparatus with columns in said another table to be joined with said table, into said internal memory in said data base processing unit during the reading of said another table by said third means.

5. An apparatus for processing a data base, having tables each including columns and rows of data, in a computer system comprising:

(a) a CPU;

(b) a main memory unit for storing tables;

(c) an auxiliary memory unit for storing tables as said data base;

(d) a data base processing unit connected to said CPU, said main memory unit and said auxiliary memory unit, including (d-1) first means for transferring a table from said auxiliary memory unit to said main memory unit, (d-2) second means for storing columns of said table specified in an operation to be performed by said apparatus into an internal memory in said data base processing unit, (d-3) third means for reading another table to be joined with said table from said auxiliary memory unit, and (d-4) fourth means for storing columns of said another table into said internal memory in said data base processing unit during the reading of said table by said third means; and fifth means for adding addresses of rows which cross said columns of said table transferred to said main memory unit to said contents of said columns of said table in said internal memory in said data base processing unit, said addresses being ones of said main memory unit storing said rows.

6. An apparatus for processing a data base, having tables each including columns and rows of data, in a computer system comprising:

(a) a CPU;

(b) a main memory unit for storing tables;

(c) an auxiliary memory unit for storing tables as said data base;

(d) a data base processing unit connected to said CPU, said main memory unit and said auxiliary memory unit, including (d-1) first means for transferring a table from said auxiliary memory unit to said main memory unit, (d-2) second means for storing columns of said table specified in an operation to be performed by said apparatus into an internal memory in said data base processing unit, (d-3) third means for reading another table to be joined with said table from said auxiliary memory unit, and (d-4) fourth means for storing columns of said another table into said internal memory in said data base processing unit during the reading of said table by said third means; and sixth means for transferring contents of said columns of said table and said another table from said internal memory in said data base processing unit to said main memory unit.

7. An apparatus for processing a data base, having tables each including columns and rows of data, in a computer system comprising:
(a) a CPU;
(b) a main memory unit for storing tables;
(c) an auxiliary memory unit for storing tables as said data base;
(d) a data base processing unit connected to said CPU, said main memory unit and said auxiliary memory unit, including
(d-1) first means for transferring a table from said auxiliary memory unit to said main memory unit,
(d-2) second means for storing columns of said table specified in an operation to be performed by said apparatus into an internal memory in said data base processing unit,
(d-3) third means for reading another table to be joined with said table from said auxiliary memory unit, and
(d-4) fourth means for storing columns of said another table into said internal memory in said data base processing unit during the reading of said table by said third means;
seventh means for executing an operation, specified by said apparatus, between specified columns of said another table and said columns stored in said internal memory in said data base processing unit in synchronism with reading said another table from said auxiliary memory unit, said operation being executed row by row; and
eighth means for storing specified columns crossing rows for which the execution result of said operation satisfies a condition specified by said apparatus into said internal memory in said data base processing unit.

8. An apparatus for processing a data base according to claim 7, wherein said eighth means comprises:
means for transferring contents of said specified columns stored in said internal memory to said main memory unit.

9. An apparatus for processing a data base according to claim 8, further comprising:
means for storing columns of said another table, which are specified in an operation with columns of said table to be joined with said another table, and cross-rows for which the execution result of said operation satisfies a condition specified by said apparatus into said internal memory in said data base processing unit.

10. An apparatus for processing a data base, having tables each including columns and rows of data, in a computer system comprising:
(a) a CPU;
(b) a main memory unit for storing tables;
(c) an auxiliary memory unit for storing tables as said data base;
(d) a data base processing unit connected to said CPU, said main memory unit and said auxiliary memory unit, including
(d-1) first means for transferring a table from said auxiliary memory unit to said main memory unit,
(d-2) second means for storing columns of said table specified in an operation to be performed by said apparatus into an internal memory in said data base processing unit,
(d-3) third means for reading another table to be joined with said table from said auxiliary memory unit, and
(d-4) fourth means for storing columns of said another table into said internal memory in said data base processing unit during the reading of said table by said third means; and
ninth means for sorting data of said columns of said table stored in said internal memory of said data base processing unit.

11. An apparatus for processing a data base according to claim 10, further comprising:
tenth means for adding addresses of said specified columns crossing rows for which the execution result of said operation satisfies a condition specified by said apparatus in said main memory unit to said contents of said columns in said internal memory in said data base processing unit, said address being ones of said main memory unit.

12. A search method of a key word from a key word sequence stored in ascending order in a memory, comprising the steps of:
inputting a search key;
determining a first maximum address of said memory in which a key word which is smaller than said search key is stored;
determining a second maximum address of said memory in which a key word which is not larger than said search key is stored; and
outputting said first and second maximum addresses of said memory as an address range in which a key word in said key word sequence matching said search key is stored.

13. A search method of a key word from a key word sequence stored in descending order in a memory, comprising the steps of:
inputting a search key;
determining a first maximum address of said memory having stored therein a key word that is larger than said search key;
determining a second maximum address of said memory n which a key word which is not smaller than said search key is stored; and
outputting said first and second maximum addresses of said memory as an address range in which a key word in said key word sequence matching said search key is stored.

14. A search system comprising:
a search key buffer for inputting a search key;
a first relative address register, designating said search key buffer, in which all m bits are initialized with zero and in which bits designated by said system are setable bit by bit from the most significant bit to the least significant bit;
first means for comparing said search key in said search key buffer with a key word which is stored in a search buffer in ascending order designated by said first relative address register, for outputting "1", when said search key is smaller than said key word stored in said search buffer, to a designated bit of said first relative address register;
a second relative address register, designating said search key buffer, in which all m bits are initialized with zero and in which bits designated by said system are setable bit by bit from the most significant to the least significant bit;

second means for comparing said search key in said search key buffer with a key word which is stored in a search buffer designated by said second relative address register and for outputting "1", when said search key is not larger than said key word stored in said search buffer, to a designated bit of said second relative address register; and means for outputting contents of said first and second relative address registers.

15. A search system comprising:

a search key buffer for inputting a search key;

a first relative address register, designating said search key buffer, in which all m bits are initialized with zero and in which bits designated by said system are setable bit by bit from the most significant bit to the least significant bit;

first means for comparing said search key in said search key buffer with a key word which is stored in a search buffer in descending order designated by said first relative address register and for outputting "1", when said search key is smaller than said key word stored in said search buffer, to a designated bit of said first relative address register;

a second relative address register, designating said search key buffer, in which all m bits are initialized with zero and in which bits designated by said system are setable bit by bit from the most significant bit to the least significant bit;

second means for comparing said search key in said search key buffer with a key word which is stored in a search buffer designated by said second relative address register and for outputting "1", when said search key is not larger than said key word stored in said search buffer, to a designated bit of said second relative address register; and means for outputting contents of said first and second relative address registers.

* * * * *